United States Patent
Kang

(10) Patent No.: US 11,856,433 B2
(45) Date of Patent: Dec. 26, 2023

(54) METHOD FOR TRANSMITTING/RECEIVING SIGNAL IN WIRELESS COMMUNICATION SYSTEM, AND DEVICE THEREFOR

(71) Applicant: LG ELECTRONICS INC., Seoul (KR)

(72) Inventor: Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 699 days.

(21) Appl. No.: 16/975,381

(22) PCT Filed: Feb. 25, 2019

(86) PCT No.: PCT/KR2019/002274
§ 371 (c)(1),
(2) Date: Oct. 9, 2020

(87) PCT Pub. No.: WO2019/164363
PCT Pub. Date: Aug. 29, 2019

(65) Prior Publication Data
US 2023/0132757 A1      May 4, 2023

Related U.S. Application Data

(60) Provisional application No. 62/634,913, filed on Feb. 25, 2018.

(51) Int. Cl.
*H04W 24/10* (2009.01)
*H04L 5/14* (2006.01)
*H04W 16/28* (2009.01)

(52) U.S. Cl.
CPC ............... *H04W 24/10* (2013.01); *H04L 5/14* (2013.01); *H04W 16/28* (2013.01)

(58) Field of Classification Search
CPC ........ H04W 24/10; H04W 16/28; H04L 5/14; H04L 5/00; H04B 7/06; H04B 7/08; H04B 7/26
See application file for complete search history.

(56) References Cited

U.S. PATENT DOCUMENTS

| 2008/0013520 A1 | 1/2008 | Liu et al. |
| 2013/0114468 A1 | 5/2013 | Hui et al. |
| 2019/0081688 A1* | 3/2019 | Deenoo ............... H04L 5/005 |

FOREIGN PATENT DOCUMENTS

| KR | 20130094177 | 8/2013 |
| KR | 20160113869 | 10/2016 |

OTHER PUBLICATIONS

PCT International Application No. PCT/KR2019/002274, International Search Report dated Jun. 13, 2019, 3 pages.
(Continued)

*Primary Examiner* — Chuong A Ngo
(74) *Attorney, Agent, or Firm* — LEE HONG DEGERMAN KANG WAIMEY

(57) ABSTRACT

The present specification provides a method for simultaneously transmitting/receiving an uplink signal and a downlink signal in a wireless communication system for supporting SDD. More particularly, a method performed by a terminal includes the steps of: measuring a beam on the basis of at least one wireless unit including resources and a plurality of antennas related to beam management; reporting a result of the beam measurement to a base station; and simultaneously transmitting/receiving an uplink signal and a downlink signal to/from the base station on the basis of first beam pair information, when the simultaneous transmission/reception of the uplink signal and the downlink signal on the same symbol to/from the base station is configured.

11 Claims, 20 Drawing Sheets

(56) References Cited

OTHER PUBLICATIONS

Intel Corporation, "Discussion on Control Signaling for DL Beam Managment," 3GPP TSG-RAN WG1 Meeting #90, R1-1712554, Prague, P.R. Czech, Aug. 21-25, 2017, 6 pages.

* cited by examiner

[FIG. 1]
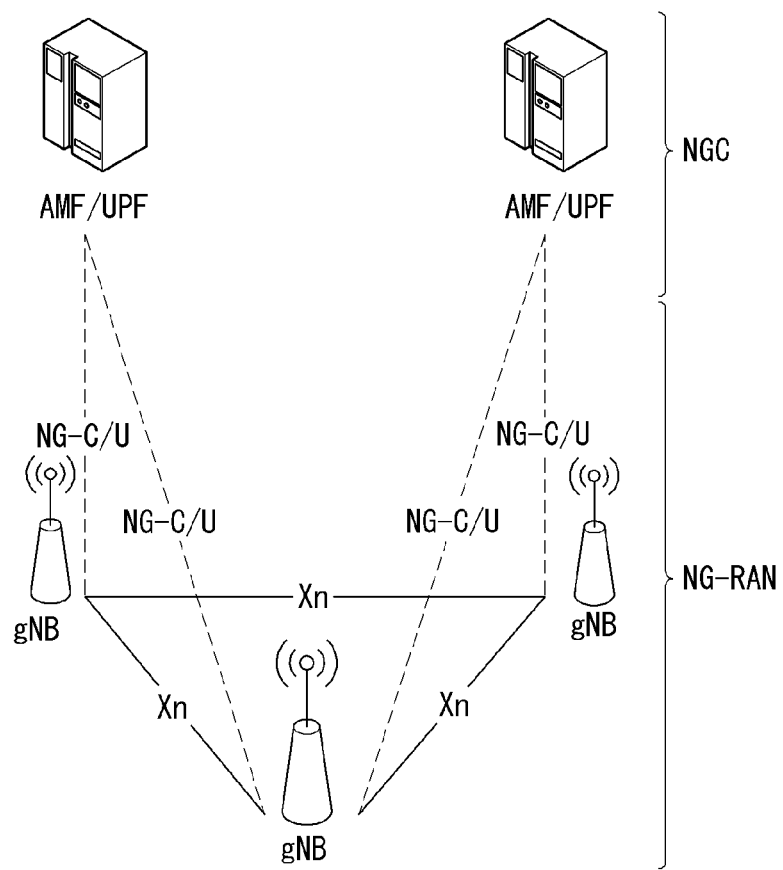

[FIG. 2]
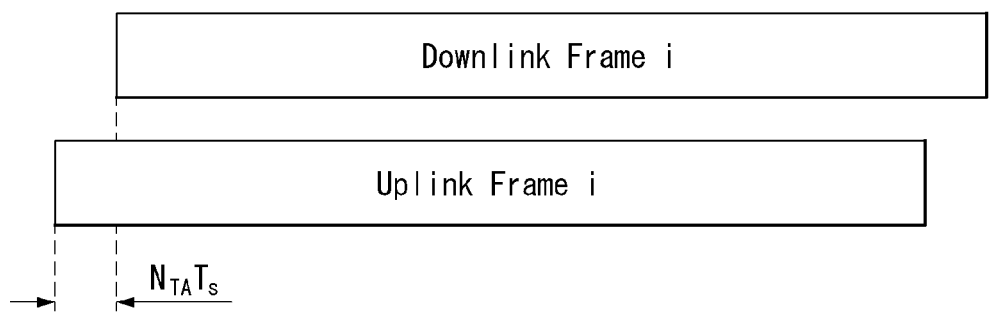

[FIG. 3]
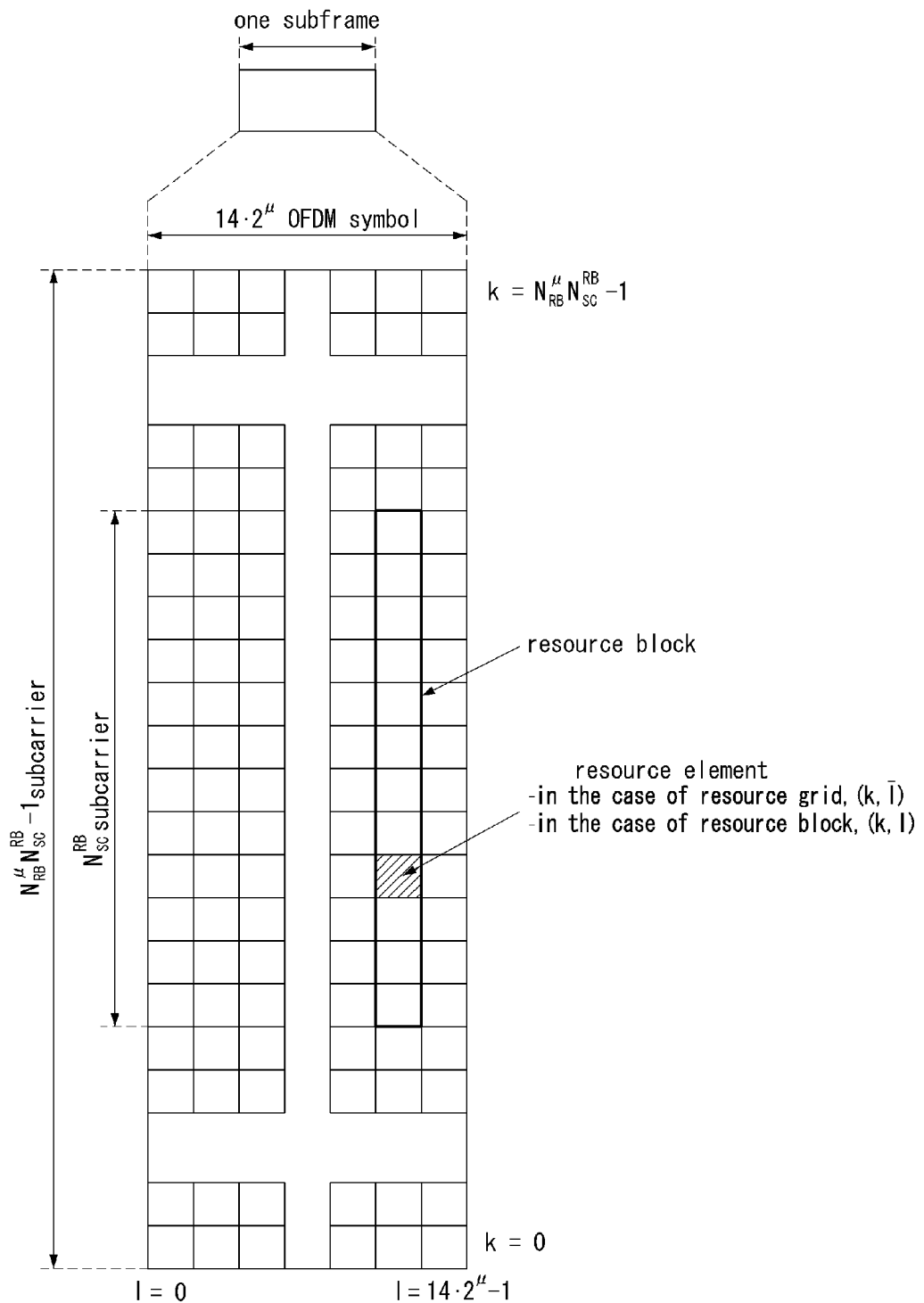

[FIG. 4]
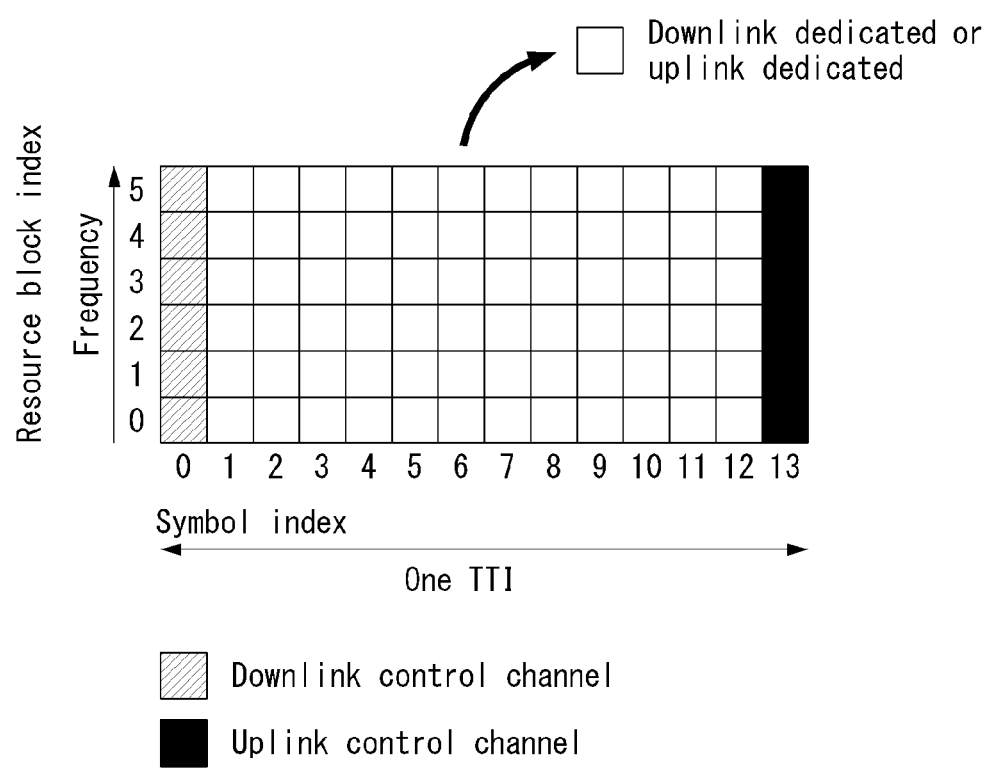

[FIG. 5]
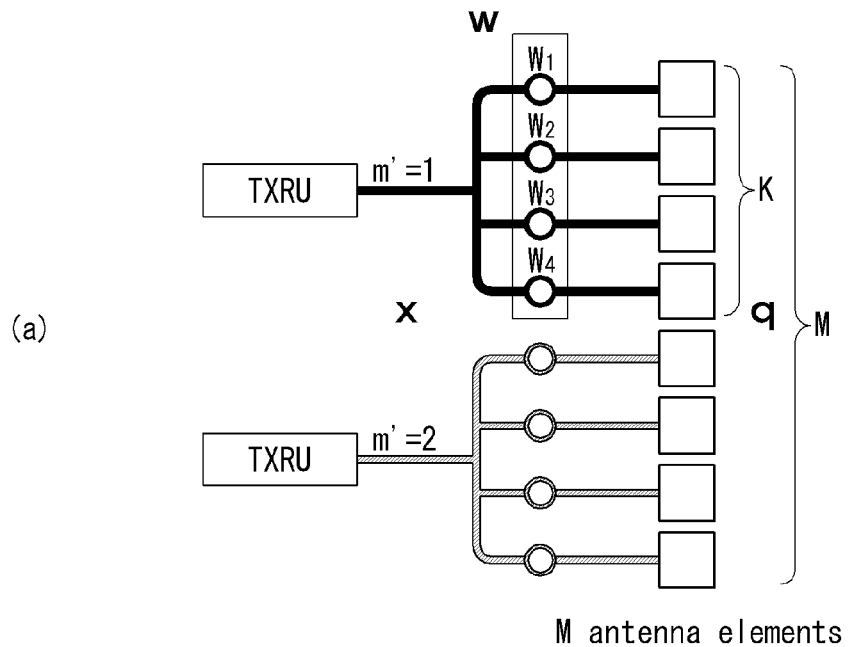
(a)
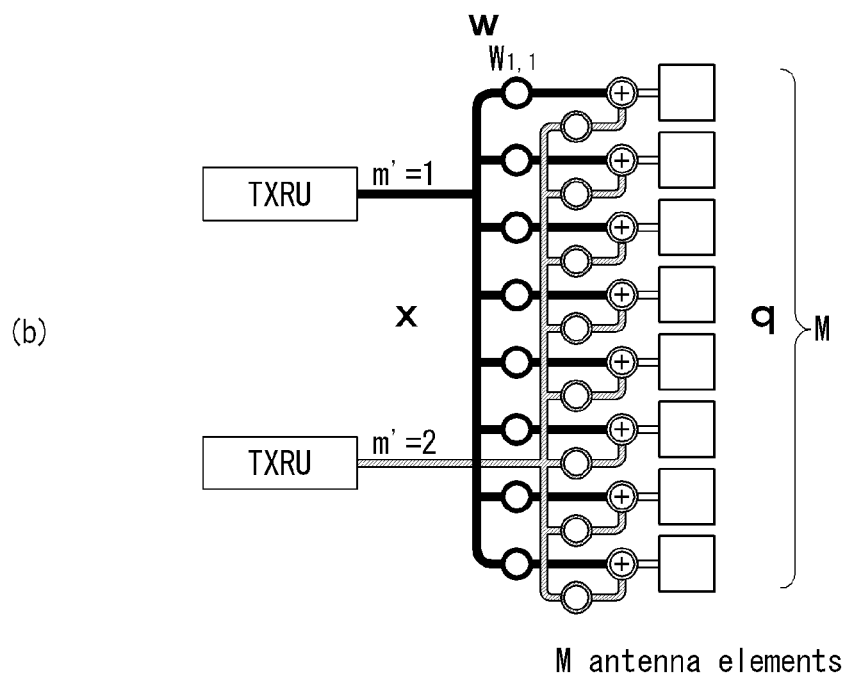
(b)

[FIG. 6]
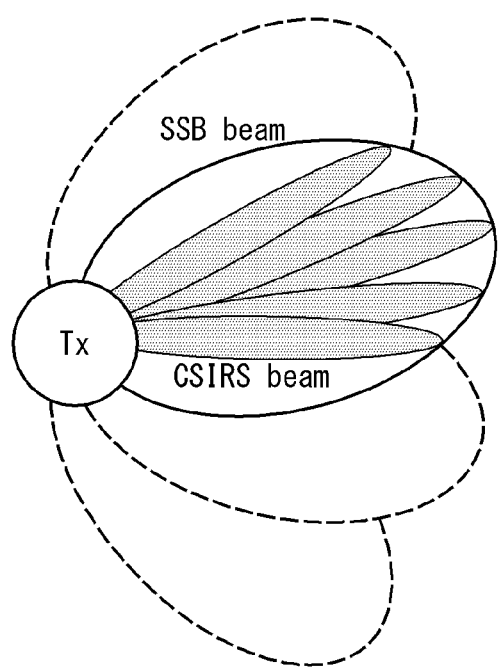

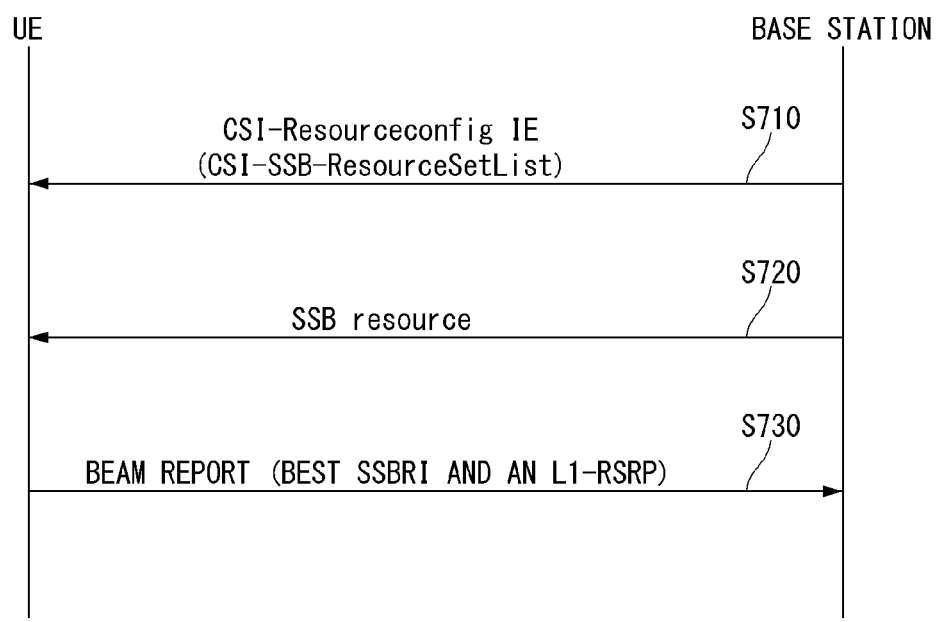
[FIG. 7]

[FIG. 8]
(a)
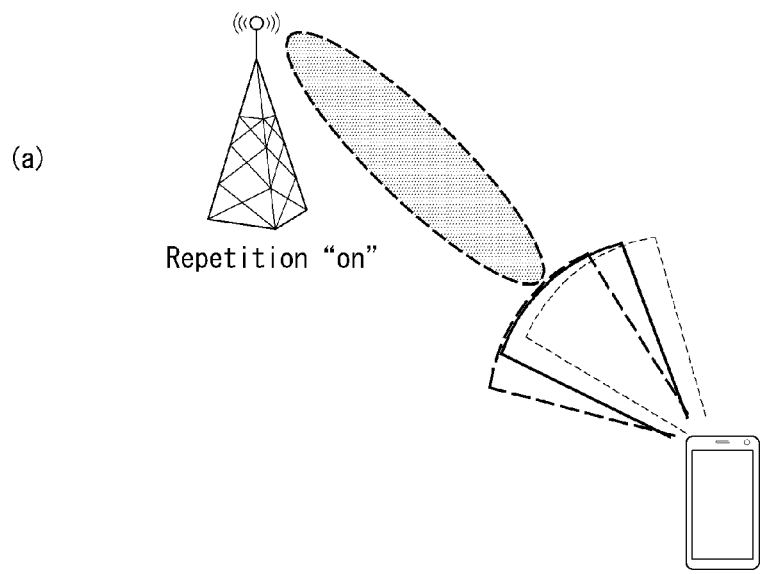
Repetition "on"
(b)
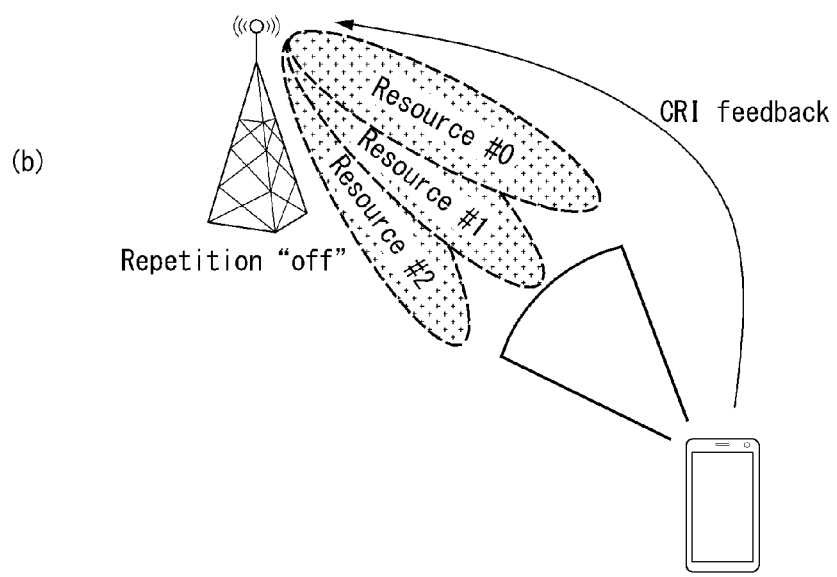
Repetition "off"

[FIG. 9]
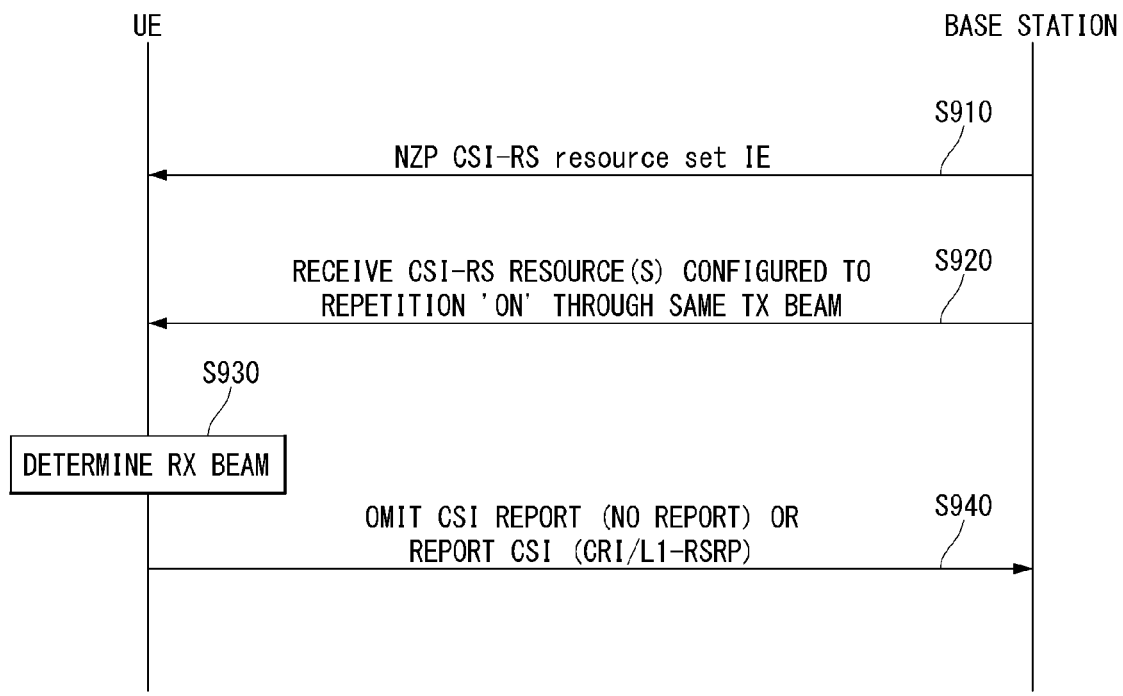

[FIG. 10]
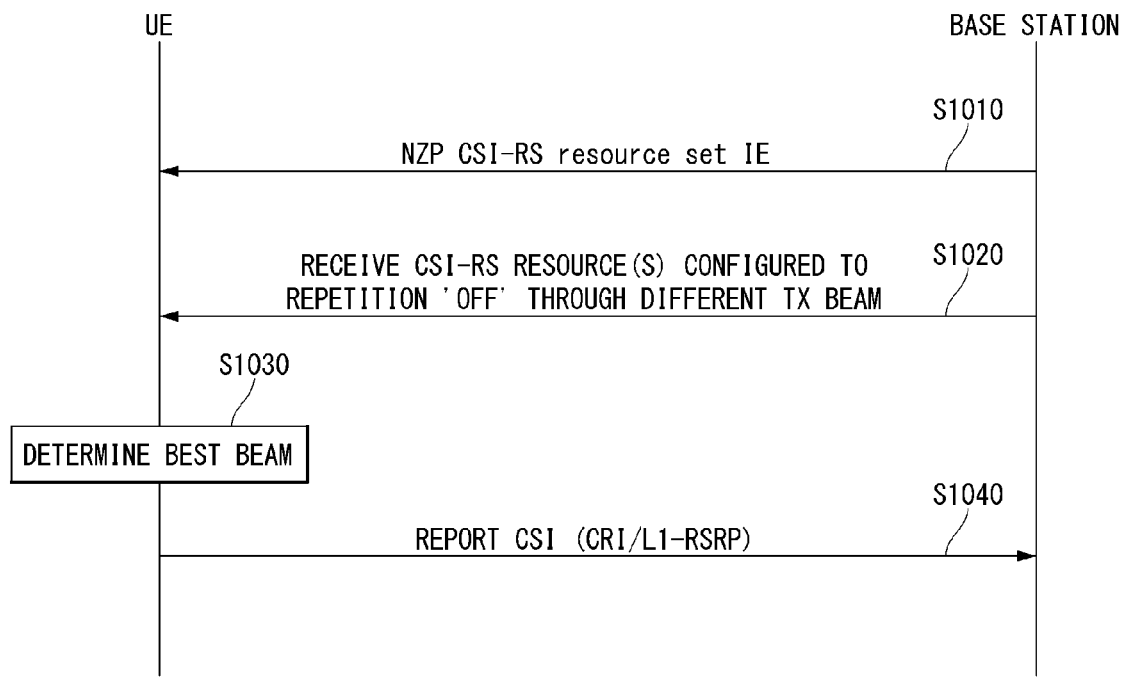

[FIG. 11]
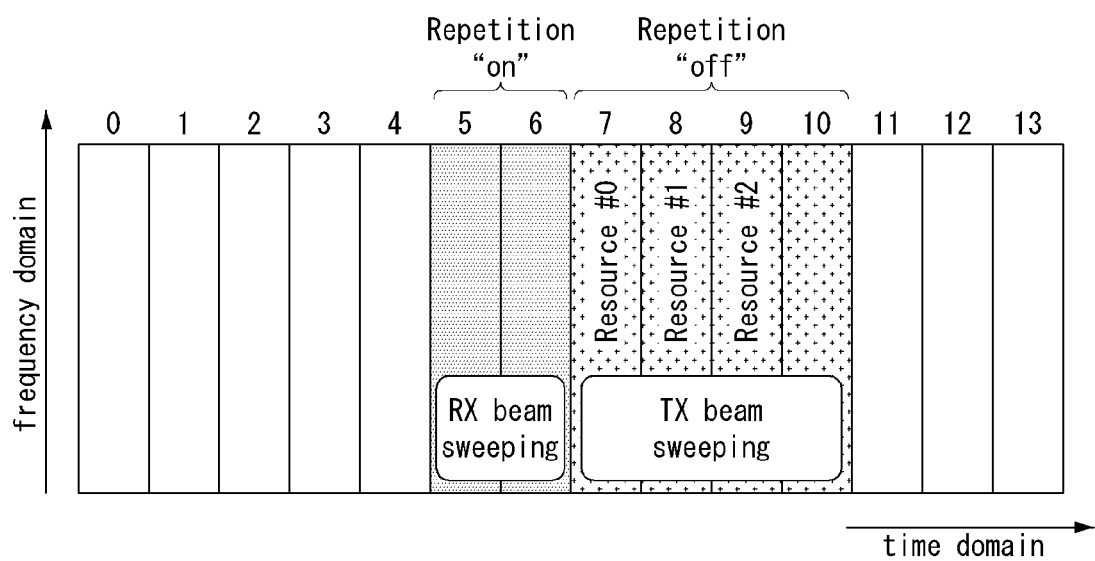

[FIG. 12]
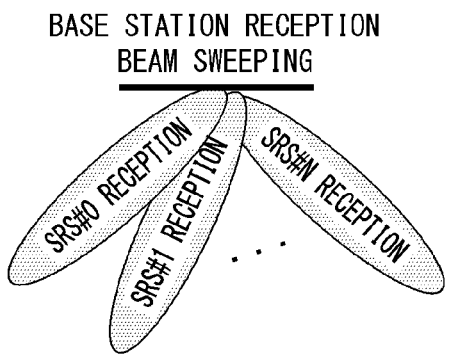
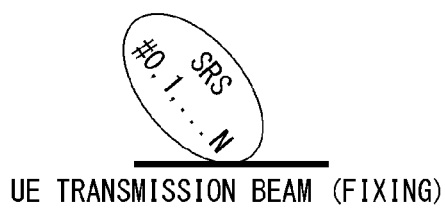
(a)
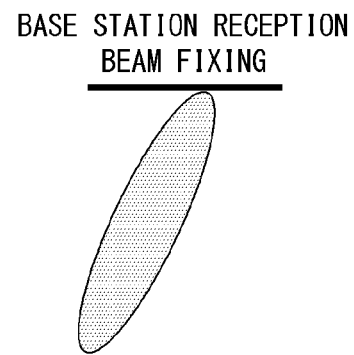
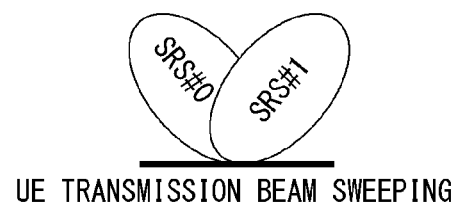
(b)

[FIG. 13]
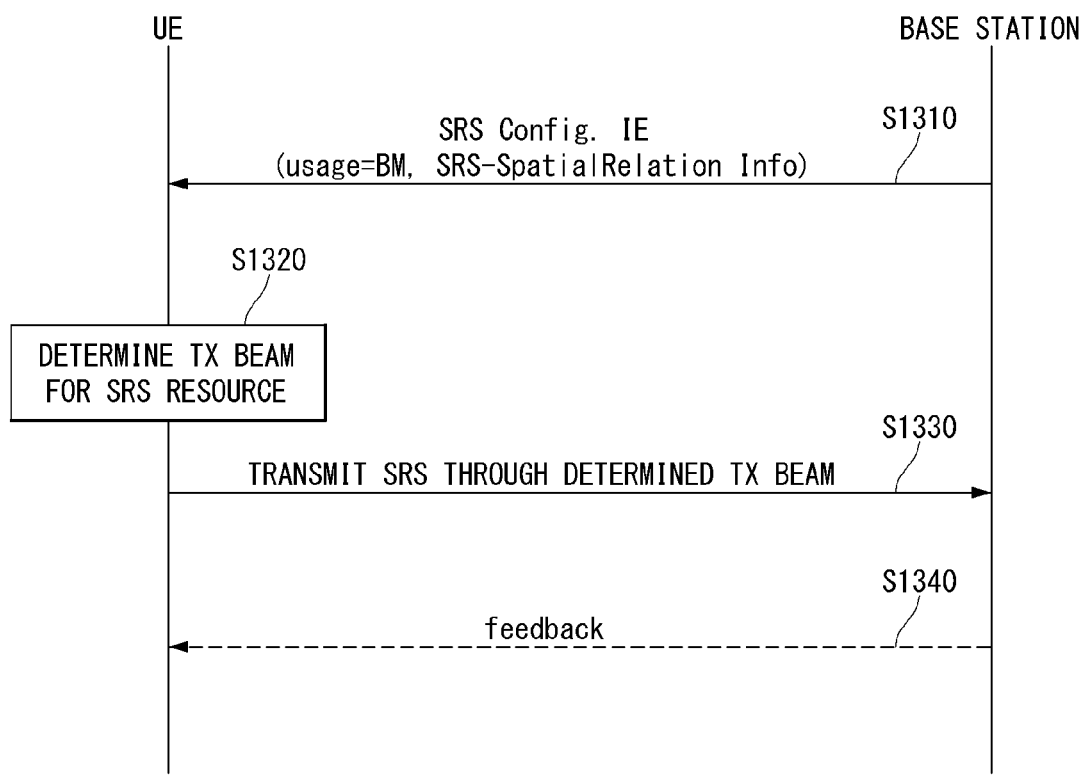

[FIG. 14]
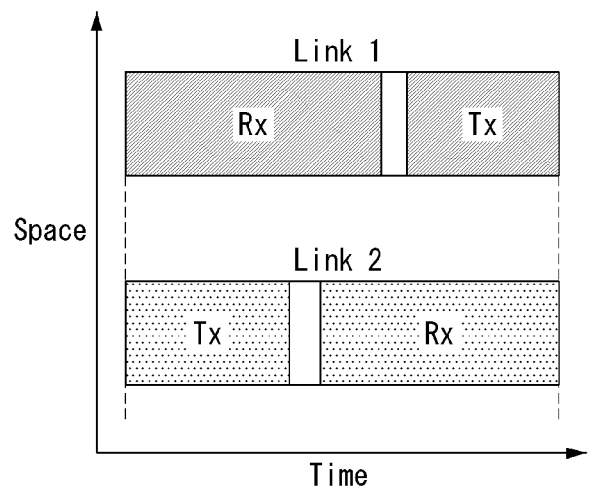
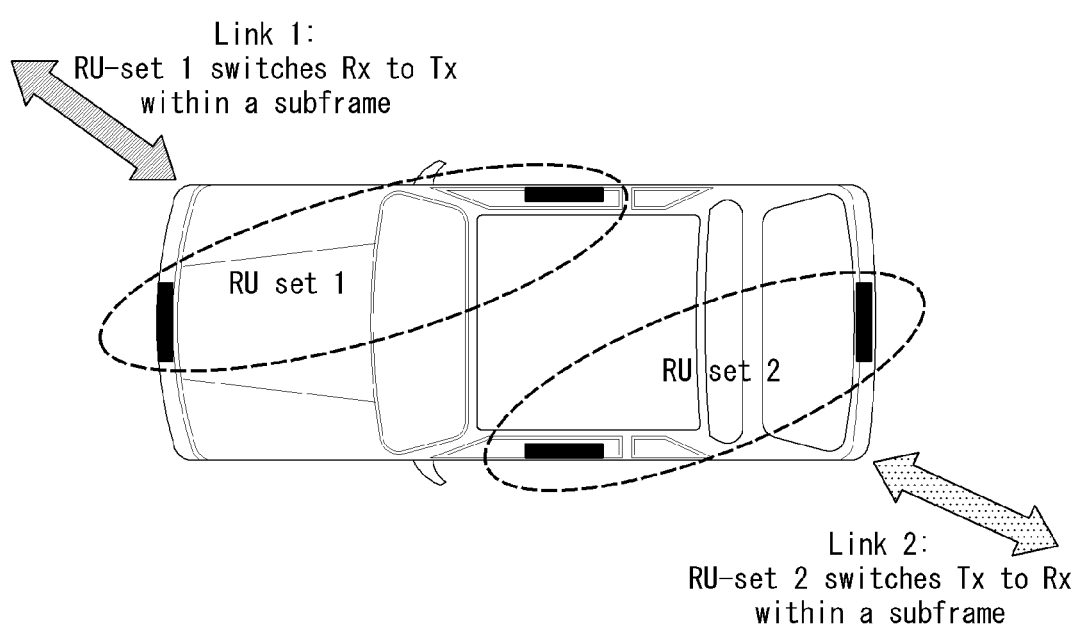

【FIG. 15】
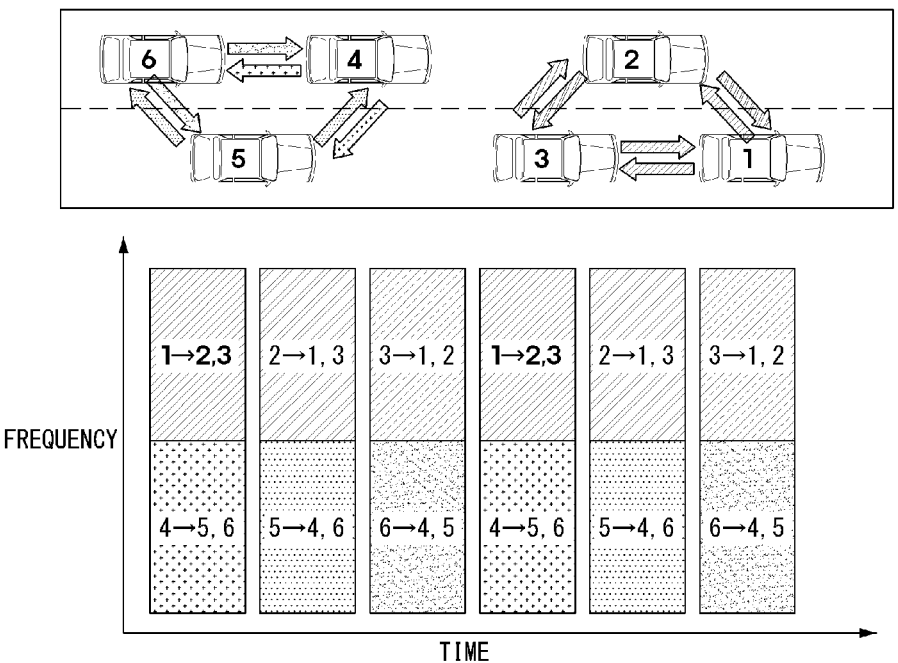
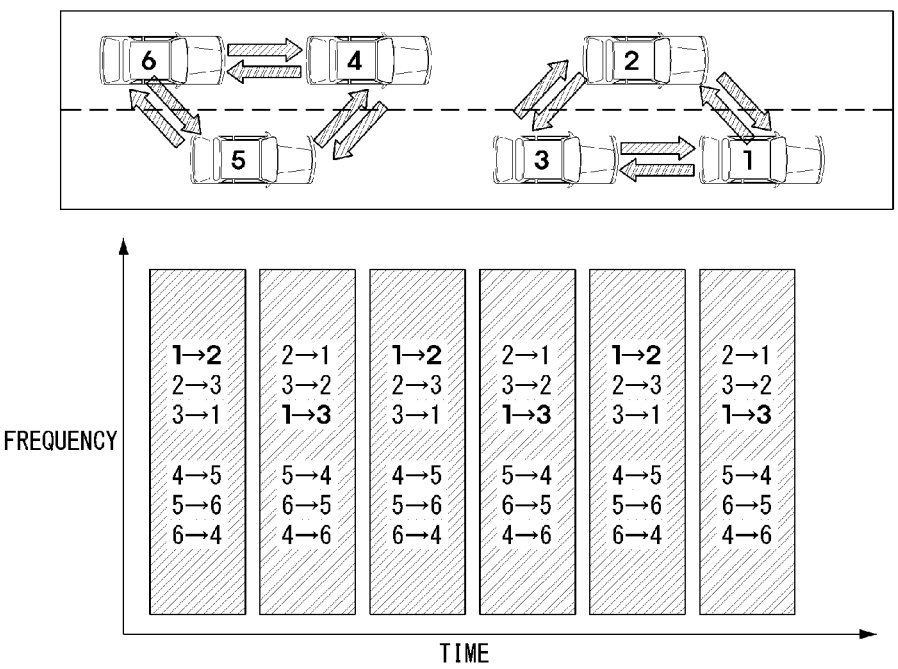

[FIG. 16]
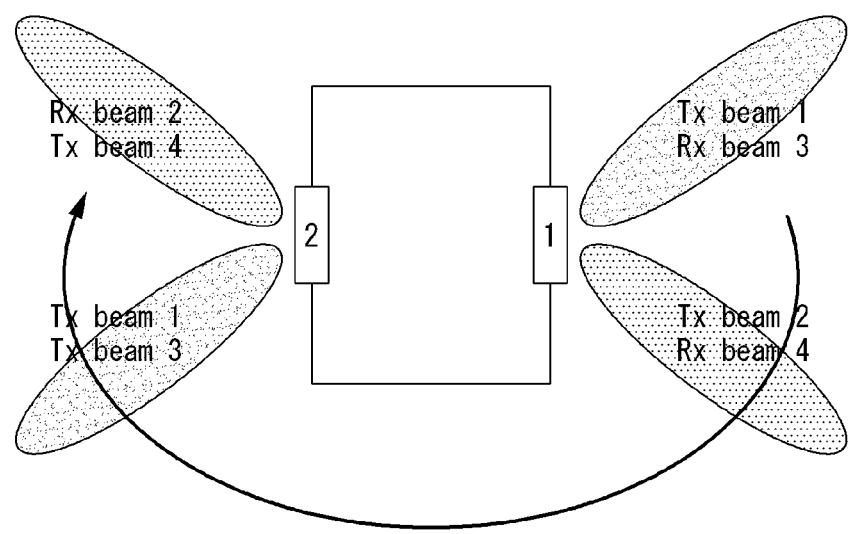

[FIG. 17]
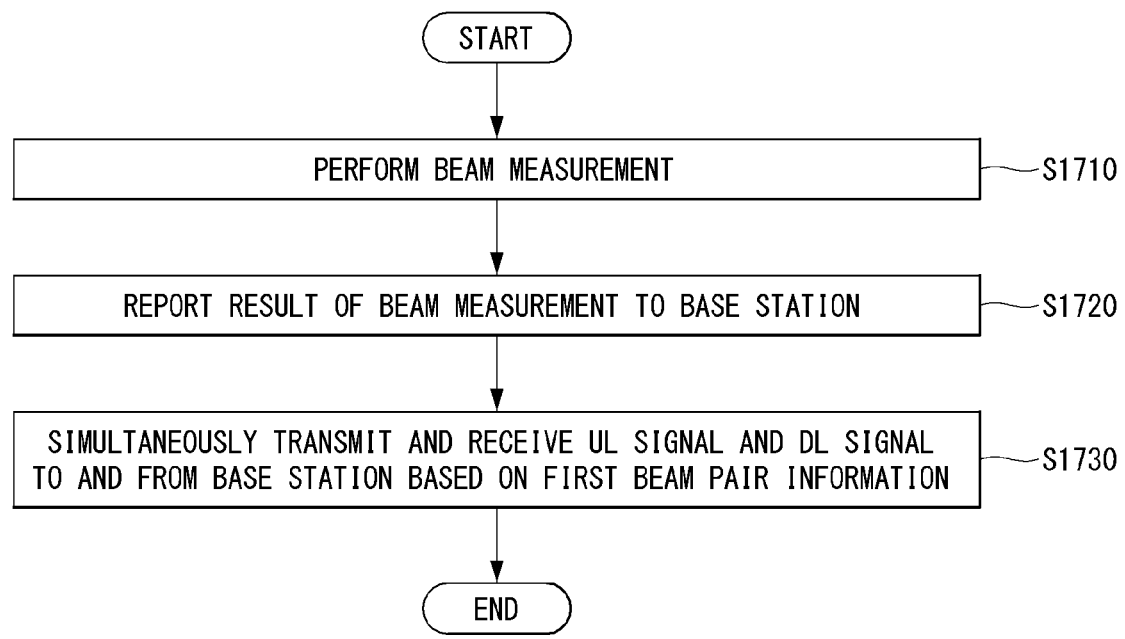

[FIG. 18]
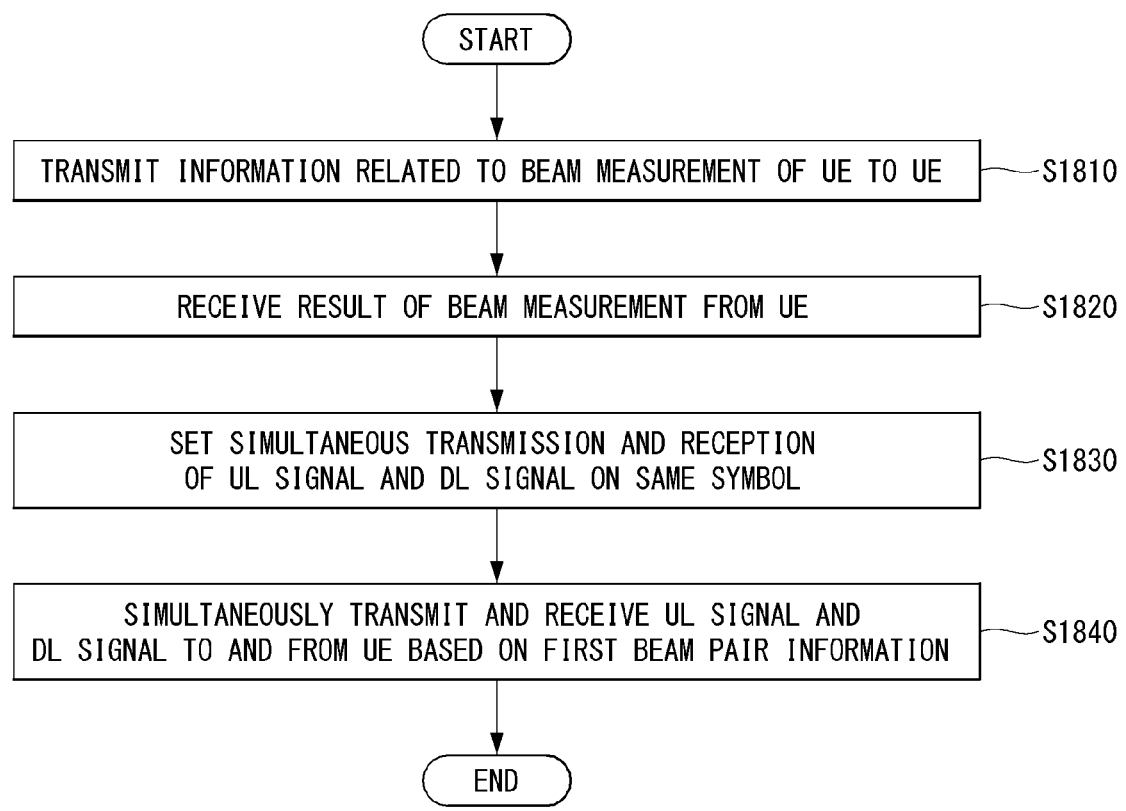

[FIG. 19]
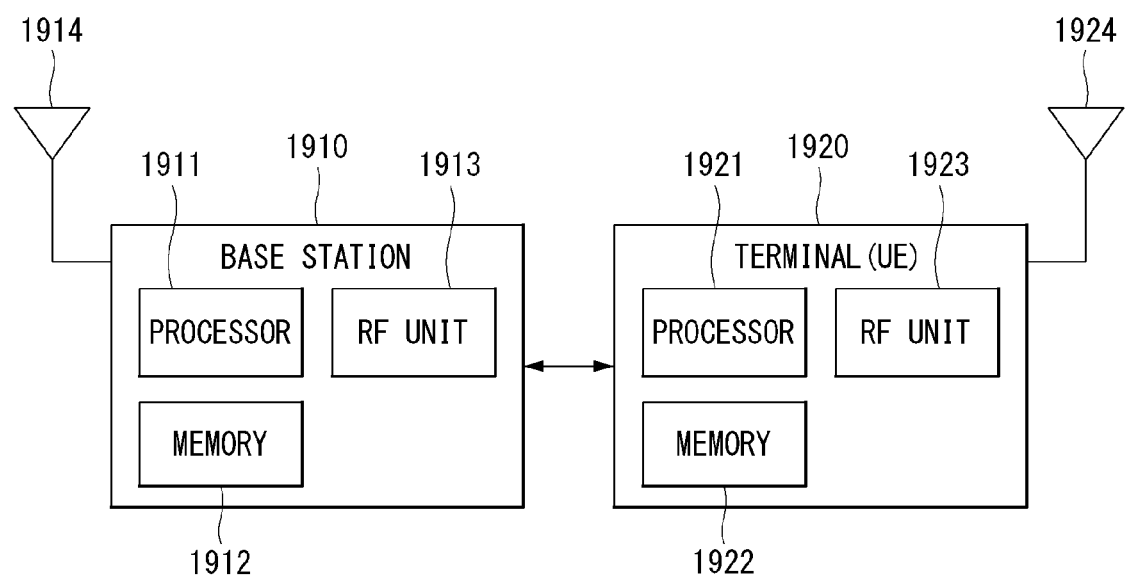

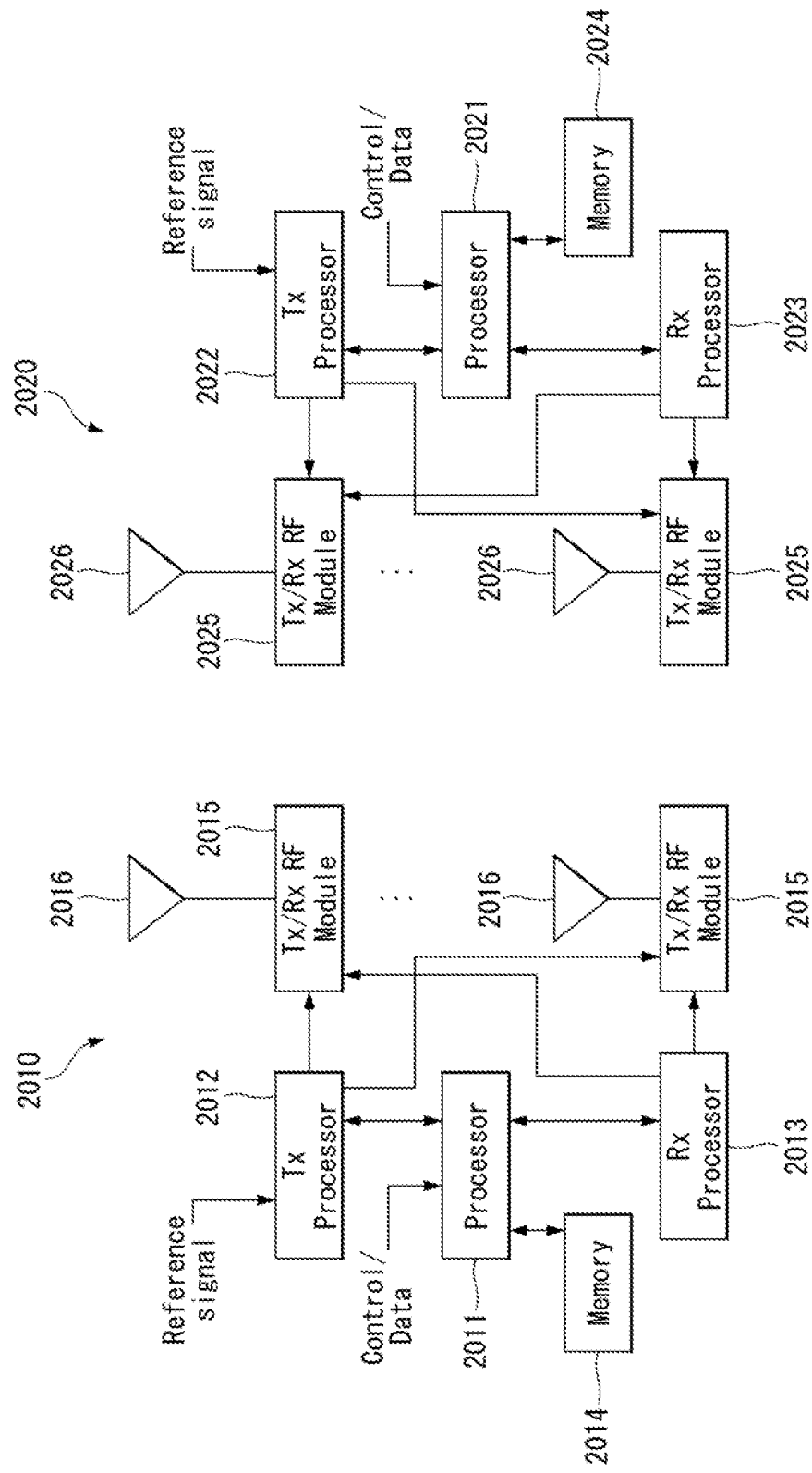

METHOD FOR TRANSMITTING/RECEIVING SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/002274, filed on Feb. 25, 2019, which claims the benefit of U.S. Provisional Application No. 62/634,913, filed on Feb. 25, 2018, the contents of which are all hereby incorporated by reference herein in their entirety.

TECHNICAL FIELD

The present disclosure relates to a wireless communication system, and more particularly, to a method for transmitting and receiving signals in a wireless communication system for supporting SDD and a device for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure provides a method of efficiently performing beam management in a terminal having a large size, such as a vehicle, by using an SDD enabling or disabling beam pair relationship.

The technical problems to be achieved in the present disclosure are not limited to the above-described technical problem, and other technical problems that are not described will be clearly understood by those skilled in the art from the following description.

Technical Solution

In an aspect, in a method for simultaneously transmitting and receiving an uplink signal and a downlink signal in a wireless communication system for supporting spatial division duplexing (SDD), the method performed by a terminal includes performing beam measurement based on at least one radio unit including a plurality of antennas and a resource related to beam management; reporting a result of the beam measurement to a base station, wherein the result of the beam measurement includes at least one of first beam pair information about a combination of a transmission beam and a reception beam in which the SDD is enabled or second beam pair information about a combination of a transmission beam and a reception beam in which the SDD is disabled; and simultaneously transmitting and receiving the uplink signal and the downlink signal to and from the base station based on the first beam pair information, when a configuration for simultaneous transmission and reception of the uplink signal and the downlink signal on the same symbol is received from the base station.

Further, in the present disclosure, the transmission beam is a transmission reference signal (RS) resource identifier (ID), and the reception beam is a reception RS resource ID.

Further, in the present disclosure, the uplink signal and the downlink signal are frequency division multiplexed (FDM) on the same symbol.

Further, in the present disclosure, the uplink signal and the downlink signal are mapped to different resource block (RB) sets within a bandwidth part (BWP) or are mapped to different subcarrier indexes within the same RB set.

Further, in the present disclosure, the method further includes receiving information indicating a specific beam pair among the first beam pair information from the base station, wherein the uplink signal and the downlink signal are simultaneously transmitted and received to and from the base station based on the specific beam pair.

Further, in the present disclosure, the performing of beam measurement includes searching for a beam pair in which SDD is enabled so as to simultaneously transmit and receive the uplink signal and the downlink signal.

Further, in the present disclosure, the combination of the transmission beam and the reception beam has a one-to-one mapping or many-to-one mapping relationship.

Further, in the present disclosure, whether the SDD is enabled or disabled is determined through comparison of a value of self-interference (SI) and a specific threshold.

In another aspect, a terminal for simultaneously transmitting and receiving an uplink signal and a downlink signal in a wireless communication system for supporting spatial division duplexing (SDD) includes a transmitter for transmitting a radio signal; a receiver for receiving the radio signal; and a processor functionally connected to the transmitter and the receiver, wherein the processor is configured to perform beam measurement based on at least one radio unit including a plurality of antennas and a resource related to beam management; to report a result of the beam measurement to the base station, wherein the result of the beam measurement includes at least one of first beam pair information about a combination of a transmission beam and a reception beam in which the SDD is enabled or second beam pair information about a combination of a transmission beam and a reception beam in which the SDD is disabled; and to control the transmitter and the receiver to simultaneously transmit and receive the uplink signal and the downlink signal to and from the base station based on the first beam pair information, when a configuration for simultaneous transmission and reception of the uplink signal and the downlink signal on the same symbol is received from the base station.

The present disclosure has an effect of efficiently performing beam management in a terminal having a large size, such as a vehicle, using an SDD enabling or disabling beam pair relationship.

The effects to be obtained in the present disclosure are not limited to the above-described effects, and other effects that are not described will be clearly understood by those skilled in the art from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

FIG. 1 is a diagram illustrating an example of an overall structure of a new radio (NR) system to which a method proposed by the present disclosure may be implemented.

FIG. 2 illustrates a relationship between a uplink (UL) frame and a downlink (DL) frame in a wireless communication system to which a method proposed by the present disclosure may be implemented.

FIG. 3 illustrates an example of a resource grid supported in a wireless communication system to which a method proposed by the present disclosure may be implemented.

FIG. 4 illustrates one example of a self-contained structure to which the method proposed in this disclosure may be applied.

FIG. 5 illustrates an example transceiver unit model in a wireless communication system to which the disclosure may apply.

FIG. 6 is a diagram illustrating an example of a Tx beam related to a DL BM procedure.

FIG. 7 is a flowchart illustrating an example of a DL BM procedure using an SSB.

FIG. 8 is a diagram illustrating an example of a DL BM procedure using a CSI-RS.

FIG. 9 is a flowchart illustrating an example of a process of determining a reception beam of a terminal.

FIG. 10 is a flowchart illustrating an example of a process of determining a transmission beam of a base station.

FIG. 11 is a diagram illustrating an example of resource allocation in a time and frequency domain related to an operation of FIG. 8.

FIG. 12 is a diagram illustrating an example of a UL BM procedure using an SRS.

FIG. 13 is a flowchart illustrating an example of a UL BM procedure using an SRS.

FIG. 14 is a diagram illustrating an example to which space division communication is applied.

FIG. 15 is a diagram illustrating an example of comparing a case in which SDD is not applied and a case in which SDD is applied.

FIG. 16 is a diagram illustrating an example of a Tx-Rx beam pair in which SDD is enabled proposed in the present disclosure.

FIG. 17 is a flowchart illustrating an example of an operation method of a terminal for implementing a method proposed in the present disclosure.

FIG. 18 is a flowchart illustrating an example of an operation method of a base station for implementing a method proposed in the present disclosure.

FIG. 19 illustrates a block diagram of a wireless communication device to which methods proposed in the present disclosure may be applied.

FIG. 20 is another example of a block diagram of a wireless communication device to which methods proposed in the present disclosure may be applied.

MODE FOR INVENTION

Hereinafter, some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

5G new radio (NR) defines an enhanced mobile broadband (eMBB), massive machine type communications (mMTC), ultra-reliable and low latency communications (URLLC), and vehicle-to-everything (V2X) according to usage scenarios.

The 5G NR standard is divided into standalone (SA) and non-standalone (NSA) according to co-existence between an NR system and an LTE system.

5G NR supports various subcarrier spacings, CP-OFDM in a downlink, and CP-OFDM and DFT-s-OFDM (SC-OFDM) in an uplink.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT (NR) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor fora control plane connection to an NGC Non-standalone E-UTRA: A deployment configuration an eLTE eNB requires a gNB as an anchor for a control plane connection to an NGC.

User plane gateway: A terminal point of NG-U interface.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a user equipment (UE) needs to be transmitted $T_{TA}=N_{TA}T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 3 represents the number of OFDM symbols in an extended CP, the number of slot per radio frame and the number of slot per subframe.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

With respect to physical resources in the NR system, an antenna port, a resource grid, a resource element, a resource block, a carrier part, etc., may be considered.

Hereinafter, the physical resources that may be considered in the NR system will be described in detail.

First, with respect to the antenna port, the antenna port is defined such that a channel in which a symbol thereon is carried may be inferred from a channel in which the other symbol on the same antenna port is carried. When the large-scale property of a channel carrying a symbol on one antenna port may be inferred from a channel carrying a symbol on another antenna port, it may be regarded that the two antenna ports are in quasi co-located or quasi co-location (QC/QCL) relation. Here, the large-scale property includes one or more of delay spread, Doppler spread, frequency shift, average received power, and received timing.

FIG. 3 illustrates an example of a resource grid supported in a wireless communication system to which a method proposed by the present disclosure may be implemented.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2^$\mu$ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k,l). Herein, k=0, . . . , $N_{RB}^{\mu}N_{sc}^{RB}-1$ indicates a location of a symbol in a subframe. To indicate a resource element in a slot, the index pair (k,l) is used. Herein, l=0, . . . , $N_{symb}^{\mu}-1$.

The resource element (k,l) for the numerology $\mu$ and the antenna port p corresponds to a complex value $a_{k,l}^{(p,\mu)}$. When there is no risk of confusion or when a specific antenna port or numerology is specified, the indexes p and $\mu$ may be dropped and thereby the complex value may become $a_{k,l}^{(p)}$ or $a_{k,l}$.

Further, a physical resource block is defined as $N_{sc}^{RB}=12$ consecutive subcarriers on the frequency domain. On the frequency domain, physical resource blocks are numbered from 0 to $N_{RB}^{\mu}-1$. In this case, the relationship between the physical resource block number $n_{PRB}$ on the frequency domain and resource elements (k,l) is given as in Equation 1.

$$n_{PRB} = \left\lfloor \frac{k}{N_{sc}^{RB}} \right\rfloor \quad \text{[Equation 1]}$$

Further, with respect to the carrier part, the terminal may be configured to receive or transmit using only a subset of the resource grid. In this case, a set of resource blocks configured to be received or transmitted by the terminal is numbered from 0 to $N_{URB}^{\mu}-1$ on the frequency domain.

Self-Contained Subframe Structure

FIG. 4 illustrates one example of a self-contained structure to which the method proposed in this disclosure may be applied.

In order to minimize data transmission latency in a TDD system, 5 generation (5G) new RAT considers a self-contained subframe structure as shown in FIG. 4.

In FIG. 4, a hatched area (symbol index 0) represents a downlink (DL) control area, and a black portion (symbol index 13) represents an uplink (UL) control area. An area without a shaded mark may be used for DL data transmission or may be used for UL data transmission. The feature of this structure is that DL transmission and UL transmission may be sequentially performed in one subframe and that DL data may be transmitted in the subframe, and that ULACK/NACK may also be received. As a result, when a data transmission error occurs, it takes less time to retransmit the data, thereby minimizing latency of final data transmission.

In this self-contained subframe structure, a time gap is required for a base station and a UE to switch from a transmission mode to a reception mode or to switch from a reception mode to a transmission mode. To this end, in the self-contained subframe structure, some OFDM symbols at a time point of switching from DL to UL are set as a guard period (GP).

Analog Beamforming

Millimeter wave (mmW) allows for installation of multiple antenna elements in the same area thanks to its short wavelength. In other words, in the 30 GHz band, the wavelength is 1 cm, and a total of 64 (8×8) antenna elements may be installed in a 2-dimensional array at every 0.5 lambda (i.e., wavelength) interval in the 4×4 (4 by 4) (cm) panel. Hence, mmW increases coverage or throughput by raising beamforming (BF) gain by use of multiple antenna elements.

In this case, a transceiver unit (TXRU) to enable adjustment of transmission power and phase per antenna element allows for independent beamforming per frequency resource. However, installing TXRUs in all of the 100 antenna elements is impracticable in terms of price. Hence, a scheme being in consideration is to map multiple antenna elements to one TXRU and to adjust the direction of beam with an analog phase shifter. Such analog BF scheme may create only one beam direction over the entire band and is thus unable to achieve selective BF.

As a middle form between digital BF and analog BF, there may be considered hybrid BF with B TXRUs which are fewer than Q antenna elements. In this case, although there are differences in connections between B TXRUs and Q antenna elements, the number of beam directions in which simultaneous transmission is possible is limited to B or less.

Representative example connections between TXRU and antenna element are described with reference to the drawings.

FIG. 5 illustrates an example transceiver unit model in a wireless communication system to which the disclosure may apply.

The TXRU virtualization model represents the relationship between TXRU output signal and antenna element output signal. Depending on the correlation between antenna element and TXRU, they may be divided into TXRU virtualization model option-1: sub-array partition model as shown in FIG. 5(a) and TXRU virtualization model option-2: full-connection model as shown in FIG. 5(b).

Referring to FIG. 5(a), in the case of sub-array partition model, antenna elements are split into multiple antenna element groups, and each TXRU is connected with one of the groups. In this case, the antenna element is connected to only one TXRU.

Referring to FIG. 7(b), in the case of full-connection model, multiple TXRU signals are combined and transmitted to a single antenna element (or antenna element array). In other words, this denotes a scheme in which the TXRUs are connected to all the antenna elements. In this case, the antenna element is connected to all the TXRUs.

In FIG. 5, q is the transmission signal vector of M co-polarized antenna elements in one column. w is the wideband TXRU virtualization weight vector, and W refers to the phase vector multiplied by the analog phase shifter. That is, the direction of analog beamforming is determined by W. x is the signal vector of M_TXRU TXRUs.

Here, mapping between antenna ports and TXRUs may be 1-to-1 or 1-to-many.

The TXRU-to-element mapping shown in FIG. 5 is merely an example, and the disclosure is not limited thereto. The disclosure may apply likewise to TXRU-to-antenna element mapping that may be implemented in other various forms in terms of hardware.

Channel State Information Feedback (CSI Feedback)

In most cellular systems including an LTE system, the terminal receives a pilot signal for channel estimation from a base station, calculates channel state information (CSI), and reports the calculated CSI to the base station.

The base station transmits a data signal based on the CSI information fed back from the terminal.

In the LTE system, the CSI information fed back by the terminal includes channel quality information (CQI), a precoding matrix index (PMI), and a rank indicator (RI).

CQI feedback is radio channel quality information providing to a base station for the purpose (for link adaptation) of providing a guide on which modulation & coding scheme (MCS) to apply when the base station transmits data.

When a radio quality between the base station and the terminal is high, the terminal feeds back a high CQI value, and the base station transmits data by applying a relatively high modulation order and a low channel coding rate, and in the opposite case, the terminal feeds back a low CQI value, and the base station transmits data by applying a relatively low modulation order and a high channel coding rate.

PMI feedback is preferred precoding matrix information providing to the base station for the purpose of providing a guide on which MIMO precoding scheme to apply when the base station has multiple antennas.

The terminal estimates a downlink MIMO channel between the base station and the terminal from a pilot signal, and recommends through PMI feedback which MIMO precoding the base station should apply.

The LTE system considers only linear MIMO precoding that may be expressed in a matrix form in a PMI configuration.

The base station and the terminal share a codebook configured with a plurality of precoding matrices, and each MIMO precoding matrix in the codebook has a unique index.

Accordingly, the terminal feeds back an index corresponding to the most preferred MIMO precoding matrix in the codebook as PMI, thereby minimizing an amount of feedback information of the terminal.

A PMI value does not have to configure with only one index. For example, when the number of transmission antenna ports is 8 in the LTE system, it is configured to derive the final 8tx MIMO precoding matrix only when two indexes (first PMI & second PMI) are coupled.

RI feedback is information about the number of preferred transmission layers providing to the base station for the purpose of providing a guide on the number of preferred transmission layers by the terminal when multi-layer transmission through spatial multiplexing is possible by installing multiple antennas by the base station and the terminal.

Hereinafter, a description on matters related to methods proposed in the present disclosure will be given.

First, when a terminal receives data (e.g., PDSCH), a method for demodulation with a UE-specific reference signal (RS) such as a specific DMRS will be described.

The UE-specific DMRS is transmitted together only in a scheduled resource block (RB)(s) of the corresponding PDSCH, and is transmitted only during a time period in which the scheduled PDSCH is transmitted.

Therefore, there may be a limitation in a reception performance when the terminal performs channel estimation only with the corresponding DMRS itself.

For example, in order to perform channel estimation, an estimated value of a major large-scale parameter/property (LSP) of a radio channel is required.

The DMRS density may be insufficient to acquire the estimated value only by the DMRS existing in a time/frequency domain in which the scheduled PDSCH is transmitted.

Therefore, in order to support implementation of such a terminal, in the case of LTE-A and NR standards, methods of defining quasi co-location (QCL) signaling, assumption, behavior, etc. between RS ports and configuring (or operating) the terminal accordingly are supported.

The term 'definition' used in the present disclosure may be used by replacing with 'configuration', 'indication', or 'determination'.

The term 'expectation' used in the present disclosure may be used by replacing with 'assumption' or 'estimation'.

'A and/or B' used in the present disclosure may be interpreted as having the same meaning as 'includes at least one of A or B'.

Hereinafter, QCL-related contents, beam management (BM), and the like will be described in more detail.

Beam Management (BM) Procedure

The beam management (BM) procedure defined in new radio (NR) will be described.

The BM procedures are layer 1 (L1)/layer 2 (L2) procedures for obtaining and maintaining a set of base station (e.g., gNB, TRP, etc.) and/or terminal (e.g., UE) beams that may be used for downlink (DL) and uplink (UL) transmission/reception and may include the following procedures and terms.

Beam measurement: an operation of measuring a characteristic of a beamforming signal received by the base station or the UE.

Beam determination: an operation in which the base station or the UE selects a transmission beam (Tx beam)/reception beam (Rx beam) thereof.

Beam sweeping: an operation of covering a spatial area using a transmitting and/or receiving beam for a predetermined time interval in a predetermined manner.

Beam report: an operation in which the UE reports information of a beam formed signal based on beam measurement.

The BM procedure may be divided into (1) a DL BM procedure using a synchronization signal (SS)/physical broadcast channel (PBCH) block or CSI-RS and (2) a UL BM procedure using a sounding reference signal (SRS).

Further, each BM procedure may include Tx beam sweeping for determining a Tx beam and Rx beam sweeping for determining an Rx beam.

DL BM Procedure

First, the DL BM procedure will be described.

The DL BM procedure may include (1) transmission of beamformed DL reference signals (RSs)(e.g., CSI-RS or SS Block (SSB)) of the base station and (2) beam reporting of the UE.

Here, beam reporting may include a preferred DL RS identifier (ID)(s) and L1-reference signal received power (L1-RSRP) corresponding thereto.

The DL RS ID may be a SSB Resource Indicator (SSBRI) or a CSI-RS Resource Indicator (CRI).

FIG. 6 is a diagram illustrating an example of a Tx beam related to a DL BM procedure.

As shown in FIG. 6, an SSB beam and a CSI-RS beam may be used for beam measurement.

Here, measurement metric is L1-RSRP for each resource/block.

The SSB may be used for coarse beam measurement, and the CSI-RS may be used for fine beam measurement.

The SSB may be used for both Tx beam sweeping and Rx beam sweeping.

Rx beam sweeping using the SSB may be performed while the UE changes the Rx beam for the same SSBRI across multiple SSB bursts.

Here, one SS burst includes one or more SSBs, and one SS burst set includes one or more SSB bursts.

DL BM Procedure Using SSB

FIG. 7 is a flowchart illustrating an example of a DL BM procedure using an SSB.

A configuration for the beam report using the SSB is performed during CSI/beam configuration in an RRC connected state (or RRC connected mode).

As in a CSI-ResourceConfig IE of Table 4, a BM configuration using the SSB is not separately defined, and the SSB is configured as in a CSI-RS resource.

Table 4 shows an example of a CSI-ResourceConfig IE.

TABLE 4

```
-- ASN1START
-- TAG-CSI-RESOURCECONFIG-START
CSI-ResourceConfig ::=        SEQUENCE {
    csi-ResourceConfigId      CSI-ResourceConfigId,
    csi-RS-ResourceSetList    CHOICE {
        nzp-CSI-RS-SSB            SEQUENCE {
            nzp-CSI-RS-ResourceSetList SEQUENCE (SIZE
(1..maxNrofNZP-CSI-RS-ResourceSetsPerConfig)) OF
NZP-CSI-RS-ResourceSetId OPTIONAL,
            csi-SSB-ResourceSetList SEQUENCE (SIZE
(1..maxNrofCSI-SSB-ResourceSetsPerConfig)) OF
CSI-SSB-ResourceSetId
    OPTIONAL
        },
        csi-IM-ResourceSetList SEQUENCE (SIZE
(1..maxNrofCSI-IM-ResourceSetsPerConfig)) OF
CSI-IM-ResourceSetId
    },
    bwp-Id                    BWP-Id,
    resourceType              ENUMERATED { aperiodic,
semiPersistent, periodic },
    ...
}
-- TAG-CSI-RESOURCECONFIGTOADDMOD-STOP
-- ASN1STOP
```

In Table 4, the csi-SSB-ResourceSetList parameter indicates a list of SSB resources used for beam management and reporting in one resource set.

The UE receives a CSI-ResourceConfig IE including a CSI-SSB-ResourceSetList including SSB resources used for BM from the base station (S710).

Here, the SSB resource set may be set to {SSBx1, SSBx2, SSBx3, SSBx4, . . . }.

The SSB index may be defined from 0 to 63.

The UE receives the SSB resource from the base station based on the CSI-SSB-ResourceSetList (S720).

When the CSI-RS reportConfig related to a report on SSBRI and L1-RSRP is configured, the UE (beams) reports the best SSBRI and L1-RSRP corresponding thereto to the base station (S730).

That is, when a reportQuantity of the CSI-RS reportConfig IE is configured to 'ssb-Index-RSRP', the UE reports the best SSBRI and L1-RSRP corresponding thereto to the base station.

When the UE configures a CSI-RS resource in the same OFDM symbol(s) as that of the SS/PBCH block (SSB), and when 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports in QCL Type D relation, the same reception beam may be applied.

Further, the UE does not expect that the CSI-RS is to be configured in the RE overlapping the RE of the SSB.

DL BM Procedure Using CSI-RS

When the UE receives a configuration of an NZP-CSI-RS-ResourceSet in which (higher layer parameter) repetition is set to 'ON', the UE may assume that at least one CSI-RS resource in the NZP-CSI-RS-ResourceSet is transmitted to the same downlink spatial domain transmission filter.

That is, at least one CSI-RS resource in the NZP-CSI-RS-ResourceSet is transmitted through the same Tx beam.

Here, at least one CSI-RS resource in the NZP-CSI-RS-ResourceSet may be transmitted with different OFDM symbols or may be transmitted (i.e., with FDM) in different frequency domains.

A case in which the at least one CSI-RS resource is FDMed is a case of a multi-panel UE.

When repetition is set to 'ON', it is related to the Rx beam sweeping procedure of the UE.

The UE does not expect to receive a different period (periodicity) in periodicityAndOffset from all CSI-RS resources in the NZP-CSI-RS-Resourceset.

When the repetition is set to 'OFF', the UE does not assume that at least one CSI-RS resource in the NZP-CSI-RS-ResourceSet is transmitted to the same downlink spatial domain transmission filter.

That is, at least one CSI-RS resource in the NZP-CSI-RS-ResourceSet is transmitted through different Tx beams.

When repetition is set to 'OFF', it is related to the Tx beam sweeping procedure of the base station.

The repetition parameter may be set only to CSI-RS resource sets associated with a CSI-ReportConfig having a report of 'No Report (or none)' or L1 RSRP.

When the UE receives a configuration of a CSI-ReportConfig in which a reportQuantity is set to 'cri-RSRP' or 'none' and when a CSI-ResourceConfig (higher layer parameter resourcesForChannelMeasurement) for channel measurement does not include higher layer parameter 'trs-Info' and includes an NZP-CSI-RS-ResourceSet set (repetition=ON) to the higher layer parameter 'repetition', the UE may be configured with only the same number of ports (1-port or 2-port) having a higher layer parameter 'nrofPorts for all CSI-RS resources in the NZP-CSI-RS-ResourceSet.

More specifically, when describing use of the CSI-RS, if a repetition parameter is set to a specific CSI-RS resource set, and if TRS_info is not set, the CSI-RS is used for beam management.

When the repetition parameter is not set and TRS_info is set, the CSI-RS is used for a tracking reference signal (TRS).

When the repetition parameter is not set and TRS_info is not set, the CSI-RS is used for CSI acquisition.

FIG. 8 is a diagram illustrating an example of a DL BM procedure using a CSI-RS.

FIG. 8(a) shows an Rx beam determination (or refinement) procedure of the UE, and FIG. 8(b) shows a Tx beam determination procedure of the base station.

Further, in FIG. 8(a), the repetition parameter is set to 'ON', and in FIG. 8(b), the repetition parameter is set to 'OFF'.

Referring to FIGS. 8(a) and 9, an Rx beam determination process of a UE will be described.

FIG. 9 is a flowchart illustrating an example of a process of determining a reception beam of the UE.

The UE receives an NZP CSI-RS resource set IE including higher layer parameter repetition from the base station through RRC signaling (S910).

Here, the repetition parameter is set to 'ON'.

The UE repeatedly receives a resource(s) in the CSI-RS resource set that is set to repetition 'ON' in different OFDM symbols through the same Tx beam (or DL spatial domain transmission filter) of the base station (S920).

Thereby, the UE determines an Rx beam thereof (S930).

Here, the UE omits a CSI report or transmits a CSI report including CRI/L1-RSRP to the base station (S940).

In this case, a reportQuantity of the CSI report config may be set to 'no report (or none)' or 'CRI and L1-RSRP'.

That is, when the UE is set to repetition 'ON', the UE may omit a CSI report or report ID information (CRI) about a preferred beam related to a beam pair and a quality value (L1-RSRP) thereof.

Referring to FIGS. 8(b) and 10, a Tx beam determination process of the base station will be described.

FIG. 10 is a flowchart illustrating an example of a process of determining a transmission beam of a base station.

The UE receives an NZP CSI-RS resource set IE including higher layer parameter repetition from the base station through RRC signaling (S1010).

Here, the repetition parameter is set to 'OFF', and is related to a Tx beam sweeping procedure of the base station.

The UE receives resources in a CSI-RS resource set that is set to repetition 'OFF' through different Tx beams (DL spatial domain transmission filters) of the base station (S1020).

The UE selects (or determines) the best beam (S1030), and reports an ID and related quality information (e.g., L1-RSRP) for the selected beam to the base station (S1040).

In this case, a reportQuantity of a CSI report config may be set to 'CRI+L1-RSRP'.

That is, when the CSI-RS is transmitted for BM, the UE reports CRI and L1-RSRP for the CRI to the base station.

FIG. 11 is a diagram illustrating an example of resource allocation in a time and frequency domain related to an operation of FIG. 8.

That is, when repetition 'ON' is set to the CSI-RS resource set, it can be seen that a plurality of CSI-RS resources are repeatedly used by applying the same transmission beam, and when repetition 'OFF' is set to the CSI-RS resource set, it can be seen that different CSI RS resources are transmitted with different transmission beams.

DL BM Related Beam Indication

The UE may receive an RRR configuration of a list of the maximum M number of candidate transmission configuration indication (TCI) states for the purpose of at least quasi co-location (QCL) indication. Here, M may be 64.

Each TCI state may be set to one RS set.

Each ID of the DL RS for spatial QCL purpose (QCL Type D) in at least RS set may refer to one of DL RS types such as SSB, P-CSI RS, SP-CSI RS, and A-CSI RS.

Initialization/update of an ID of the DL RS(s) in the RS set used for at least spatial QCL purposes may be performed through at least explicit signaling.

Table 5 shows an example of a TCI-State IE.

The TCI-State IE associates with a quasi co-location (QCL) type corresponding to one or two DL reference signals (RS).

TABLE 5

```
-- ASN1START
-- TAG-TCI-STATE-START
TCI-State ::=       SEQUENCE {
    tci-StateId     TCI-StateId,
    qcl-Type1       QCL-Info,
    qcl-Type2       QCL-Info
        OPTIONAL,   -- Need R
    ...
}
QCL-Info ::=        SEQUENCE {
    cell            ServCellIndex
        OPTIONAL,   -- Need R
    bwp-Id          BWP-Id
        OPTIONAL,   -- Cond CSI-RS-Indicated
    referenceSignal CHOICE {
        csi-rs      NZP-CSI-RS-ResourceId,
        ssb         SSB-Index
    },
    qcl-Type        ENUMERATED {typeA, typeB, typeC, typeD},
    ...
}
-- TAG-TCI-STATE-STOP
-- ASN1STOP
```

In Table 5, the bwp-Id parameter indicates DL BWP in which the RS is located, the cell parameter indicates a carrier in which the RS is located, and the reference signal parameter indicates a reference antenna port(s) to be a source of a quasi co-location for the corresponding target antenna port(s) or a reference signal including the same. The target antenna port(s) may be a CSI-RS, PDCCH DMRS, or PDSCH DMRS. For example, in order to indicate QCL reference RS information about the NZP CSI-RS, a corresponding TCI state ID may be indicated in NZP CSI-RS resource configuration information. As another example, in order to indicate QCL reference information about the PDCCH DMRS antenna port(s), a TCI state ID may be indicated in each CORESET configuration. As another example, the TCI state ID may be indicated through DCI so as to indicate QCL reference information about the PDSCH DMRS antenna port(s).

QCL (Quasi-Co Location)

The antenna port is defined such that a channel carrying a symbol thereon may be inferred from a channel carrying another symbol on the same antenna port. When a property of a channel carrying a symbol on one antenna port may be inferred from a channel carrying a symbol on another antenna port, it may be regarded that the two antenna ports are in a quasi co-located or quasi co-location (QC/QCL) relationship.

Here, the channel characteristics include one or more of delay spread, Doppler spread, frequency shift, average received power, received timing, and spatial RX parameter. Here, the Spatial Rx parameter means a spatial (reception) channel characteristic parameter such as angle of arrival.

The UE may be configured with a list of up to the M number of TCI-State configurations in a higher layer parameter PDSCH-Config so as to decode the PDSCH according to the detected PDCCH having DCI intended for the corresponding UE and a given serving cell. The M depends on UE capability.

Each TCI-State includes parameters for establishing a quasi co-location relationship between one or two DL reference signals and the DM-RS port of the PDSCH.

The quasi co-location relationship is set to a higher layer parameter qcl-Type1 for a first DL RS and qcl-Type2 (if set) for a second DL RS.

In the case of two DL RSs, the QCL type is not the same regardless of whether the reference is the same DL RS or different DL RSs.

The quasi co-location type corresponding to each DL RS is given by the higher layer parameter qcl-Type of QCL-Info and may take one of the following values:
- 'QCL-TypeA': {Doppler shift, Doppler spread, average delay, delay spread}
- 'QCL-TypeB': {Doppler shift, Doppler spread}
- 'QCL-Type C': {Doppler shift, average delay}
- 'QCL-Type D': {Spatial Rx parameter}

For example, when the target antenna port is a specific NZP CSI-RS, the corresponding NZP CSI-RS antenna ports may be indicated/configured to be QCL with a specific TRS from the viewpoint of QCL-Type A and with a specific SSB from the viewpoint of QCL-Type D. The UE, having received such indication/configuration may receive the corresponding NZP CSI-RS using Doppler and delay values measured in the QCL-TypeA TRS, and apply a received beam used for QCL-TypeD SSB reception to the corresponding NZP CSI-RS reception.

The UE receives an activation command used for mapping up to 8 TCI states to a codepoint of the DCI field 'Transmission Configuration Indication'.

UL BM Procedure

UL BM may or may not establish beam reciprocity (or beam correspondence) between Tx beams and Rx beams according to UE implementation.

When reciprocity between Tx beam and Rx beam is established at both the base station and the UE, the UL beam pair may be matched through the DL beam pair.

However, when reciprocity between the Tx beam and the Rx beam is not established in either of the base station and the UE, a UL beam pair determination process is required separately from DL beam pair determination.

Even if both the base station and the UE maintain beam correspondence, the base station may use the UL BM procedure for DL Tx beam determination without requiring the UE to report a preferred beam.

UL BM may be performed through beamformed UL SRS transmission, and the 'SRS-SetUse' parameter is set to 'Beam Management'.

Similarly, the UL BM procedure may be divided into Tx beam sweeping of the UE and Rx beam sweeping of the base station.

The UE may be configured with one or more Sounding Reference Symbol (SRS) resource sets that are set by (higher layer parameter) SRS-ResourceSet (through higher layer signaling, RRC signaling, etc.).

For each SRS resource set, the UE may set K≥1 SRS resources (higher later parameter SRS-resource).

Here, K is a natural number, and the maximum value of K is indicated by SRS_capability.

Whether the UL BM of the SRS resource set is applied is set by (higher layer parameter) SRS-SetUse.

When the SRS-SetUse is set to 'BeamManagement (BM)', only one SRS resource may be transmitted to each of the plurality of SRS resource sets at a given time instant.

FIG. 12 is a diagram illustrating an example of a UL BM procedure using an SRS.

Specifically, FIG. 12(a) shows an Rx beam determination procedure of the base station, and FIG. 12(b) shows a Tx beam determination procedure of the UE.

FIG. 13 is a flowchart illustrating an example of a UL BM procedure using an SRS.

First, the UE receives RRC signaling (e.g., SRS-Config IE) including a (higher layer parameter) usage parameter set to 'beam management' from the base station (S1310).

Table 6 shows an example of an SRS-Config Information Element (IE), and the SRS-Config IE is used for an SRS transmission configuration.

The SRS-Config IE includes a list of SRS-Resources and a list of SRS-ResourceSets.

Each SRS resource set means a set of SRS-resources.

The network triggers transmission of the SRS resource set using the configured aperiodicSRS-ResourceTrigger (L1 DCI).

TABLE 6

```
-- ASN1START
-- TAG-MAC-CELL-GROUP-CONFIG-START
SRS-Config ::=                          SEQUENCE {
    srs-ResourceSetToReleaseList            SEQUENCE (SIZE(1..maxNrofSRS-
ResourceSets)) OF SRS-ResourceSetId         OPTIONAL,   -- Need N
    srs-ResourceSetToAddModList             SEQUENCE (SIZE(1..maxNrofSRS-
ResourceSets)) OF SRS-ResourceSet           OPTIONAL,   -- Need N
    srs-ResourceToReleaseList               SEQUENCE
(SIZE(1..maxNrofSRS-Resources)) OF SRS-ResourceId
        OPTIONAL,   -- Need N
    srs-ResourceToAddModList                SEQUENCE
(SIZE(1..maxNrofSRS-Resources)) OF SRS-Resource
        OPTIONAL,   -- Need N
    tpc-Accumulation                    ENUMERATED {disabled}
            OPTIONAL,   -- Need S
    ...
}
SRS-ResourceSet ::=                     SEQUENCE {
    srs-ResourceSetId                       SRS-ResourceSetId,
    srs-ResourceIdList                      SEQUENCE (SIZE(1..maxNrofSRS-
ResourcesPerSet)) OF SRS-ResourceId         OPTIONAL,   -- Cond Setup
    resourceType                            CHOICE {
        aperiodic                               SEQUENCE {
            aperiodicSRS-ResourceTrigger        INTEGER (1..maxNrofSRS-
TriggerStates-1),
            csi-RS                              NZP-CSI-RS-ResourceId
                OPTIONAL,   -- Cond NonCodebook
            slotOffset                          INTEGER (1..32)
                OPTIONAL,   -- Need S
            ...
        },
        semi-persistent                         SEQUENCE {
            associatedCSI-RS                        NZP-CSI-RS-ResourceId
                OPTIONAL,   -- Cond NonCodebook
            ...
        },
        periodic                                SEQUENCE {
            associatedCSI-RS                        NZP-CSI-RS-ResourceId
                OPTIONAL,   -- Cond NonCodebook
            ...
        }
    },
    usage                               ENUMERATED {beamManagement,
codebook, nonCodebook, antennaSwitching},
    alpha                                   Alpha
        OPTIONAL,   -- Need S
    p0                                      INTEGER (-202..24)
        OPTIONAL,   -- Cond Setup
    pathlossReferenceRS                     CHOICE {
        ssb-Index                               SSB-Index,
        csi-RS-Index                            NZP-CSI-RS-ResourceId
SRS-SpatialRelationInfo ::=             SEQUENCE {
    servingCellId                           ServCellIndex
        OPTIONAL,   -- Need S
    referenceSignal                         CHOICE {
        ssb-Index                               SSB-Index,
        csi-RS-Index                            NZP-CSI-RS-ResourceId,
        srs                                     SEQUENCE {
            resourceId                              SRS-ResourceId,
            uplinkBWP                               BWP-Id
        }
    }
}
SRS-ResourceId ::=                      INTEGER (0..maxNrofSRS-Resources-1)
```

In Table 6, usage represents a higher layer parameter indicating whether the SRS resource set is used for beam management or codebook-based or non-codebook-based transmission.

The usage parameter corresponds to L1 parameter 'SRS-SetUse'.

'SpatialRelationInfo' is a parameter representing a configuration of a spatial relation between the reference RS and the target SRS.

Here, the reference RS may be SSB, CSI-RS, or SRS corresponding to the L1 parameter 'SRS-SpatialRelation-Info'.

The usage is set for each SRS resource set.

The UE determines a Tx beam for an SRS resource to be transmitted based on SRS-SpatialRelation Info included in the SRS-Config IE (S1320).

Here, the SRS-SpatialRelation Info is set for each SRS resource, and indicates whether to apply the same beam as that used in SSB, CSI-RS or SRS for each SRS resource.

Further, SRS-SpatialRelationInfo may or may not be set to each SRS resource.

When SRS-SpatialRelationInfo is set to the SRS resource, the same beam as that used in SSB, CSI-RS or SRS is applied and transmitted.

However, when SRS-SpatialRelationInfo is not set to the SRS resource, the UE randomly determines a Tx beam and transmits the SRS through the determined Tx beam (S1330).

More specifically, for P-SRS in which 'SRS-ResourceConfigType' is set to (1) When SRS-SpatialRelationInfo is set to 'SSB/PBCH', the UE applies the same spatial domain transmission filter (or generated from the corresponding filter) as a spatial domain Rx filter used for reception of SSB/PBCH to transmit the corresponding SRS resource.

Alternatively, (2) when SRS-SpatialRelationInfo is set to 'CSI-RS', the UE transmits an SRS resource having the same spatial domain transmission filter used for reception of periodic CSI-RS or SP CSI-RS.

Alternatively, (3) when SRS-SpatialRelationInfo is set to 'SRS', the UE applies the same spatial domain transmission filter used for transmission of a periodic SRS to transmit the corresponding SRS resource.

The same may be applied as above even when 'SRS-ResourceConfigType' is set to 'SP-SRS' or 'AP-SRS'.

Additionally, the UE may or may not receive feedback on the SRS from the base station as in the following three cases (S1340).

First, when Spatial_Relation_Info is set for all SRS resources in the SRS resource set, the UE transmits the SRS with a beam indicated by the base station.

For example, when all Spatial_Relation_Info indicate the same SSB, CRI, or SRI, the UE repeatedly transmits the SRS with the same beam.

In this case, the base station corresponds to FIG. 12(a) for selecting the Rx beam.

Second, Spatial_Relation_Info may not be set for all SRS resources in the SRS resource set.

In this case, the UE may transmit the SRS beam while freely changing the SRS beam.

That is, this case is a case in which the UE selects the Tx beam, and corresponds to FIG. 12(b).

Finally, Spatial_Relation_Info may be configured only for some SRS resources in the SRS resource set.

In this case, for the configured SRS resource, the UE transmits the SRS with the indicated beam, and for the SRS resource in which Spatial_Relation_Info is not configured, the UE may randomly apply and transmit a Tx beam.

Spatial Division Duplexing (SDD)

Space division duplexing or space division duplex considered in the present disclosure is a method of independently operating a communication link of each antenna by spatially dividing each antenna of the UE.

In order to independently operate a communication link for each antenna, self-interference (SI) between antennas held by the UE should be removed, and interference between UEs included in the communication link should also be reduced.

As a method for removing self-interference between antennas held by the UE, an analog and digital self-interference removal technique may be applied, or a technique for reducing self-interference by securing a distance between antennas may be applied.

Because the latter has lower complexity than the former, it is easy to apply the latter to an actual system.

The latter technique may be applied by securing a distance between antennas in a vehicle UE having a larger size than that of an existing communication UE.

Further, an inter-cell interference reduction technique of an existing cellular communication system may be applied to a technique for reducing interference between UEs.

Currently, because cellular communication having a high frequency of 6 GHz or higher has a small beam width so as to secure a communication distance, it is regarded that the probability of interference is low due to overlapping beams of adjacent cells.

Further, there is a high probability that the signal will be blocked by an object due to straightness thereof.

Because the vehicle has a surface made of iron and has a large size, there is a high probability of blocking high frequency signals from adjacent UEs.

Due to the above characteristics, spatial division communication is easy to apply in high frequency communication between vehicles having a distributed antenna.

In the case of applying spatial division communication, because links of the antenna are isolated from each other, it is possible to differently allocate transmission/reception time points of each communication link and to reuse frequency resources in each communication link.

FIG. 14 is a diagram illustrating an example to which space division communication is applied.

In FIG. 14, link 1 and link 2 are communication links connected to different devices (UEs or base stations).

According to the situation of each communication link, an amount of a Tx resource and an Rx resource may be changed, and a Tx time point and an Rx time point may be changed.

Further, in FIG. 14, a Radio Unit (RU) is an antenna module in which a plurality of antennas are gathered, and illustrates a case in which a UE distributes and holds four RUs.

It can be seen that two of the four RUs are used for forming link 1 and that the other two are used for forming link 2.

When SDD is applied to a plurality of UEs, there is an advantage that the greater number of transmission may be performed by using more resources within a target time than when SDD is not applied to a plurality of UEs.

FIG. 15 is a diagram illustrating an example of comparing a case in which SDD is not applied and a case in which SDD is applied.

More specifically, top of FIG. 15 shows communication between vehicles to which SDD is not applied, and bottom of FIG. 15 shows communication between vehicles to which SDD is applied.

When SDD is not applied, the UE simultaneously transmits signals to other UEs in a multiplexing method.

When three UEs want to form a communication link with each adjacent UE, as shown in FIG. 15, each UE should receive allocation of one transmission resource and two reception resources.

When SDD is applied, the UE needs to form one transmission resource and one reception resource for each communication link and thus it is possible to perform signal transmission of the greater number of times per unit time.

In the case of applying SDD, the UE should be allocated by dividing frequency resources with the adjacent UE for transmitting signals at the same time. When SDD is applied, the transmission signal of each UE is spatially divided and thus the same frequency resource may be used, and the frequency resource used by each communication link thus increases.

In addition to the above advantages, because the reception UE of each communication link receives a signal using a narrow reception beam for spatial division, the probability of being affected by jamming is lowered.

Here, jamming means emitting other radio waves at the same frequency so as to disturb radio waves of a certain frequency.

Further, because there is a high probability that adjacent vehicles block signals, it is difficult to perform jamming from a distance.

As an additional advantage, because the base station does not need to manage resources between the communication groups and resources within the communication group so that they are orthogonal to each other, there is an advantage that complexity of resource management of the base station is reduced.

For reference, the 3GPP standard document (TR 22.886) included a scenario in which 15,840 vehicles exist per mile.

In this case, complexity of the base station increases too much for the base station to manage each communication link between vehicles.

Therefore, when SDD is applied, only the transmission time point and the reception time point need to be determined between UEs included in the communication link and thus there is an advantage of reducing complexity of the base station.

Hereinafter, a method of simultaneously performing DL/UL beam management based on SDD technology in which transmission and reception of a UE may be together performed by dividing a space at the same time point proposed in the present disclosure will be described.

SDD-capable UEs may know in advance a (candidate) combination of Tx beams (or antenna panels or antennas) and Rx beams (or antenna panels or antennas) in which SDD is enabled according to a transmission/reception beam direction, a beam pattern, and a physical location of an antenna or an antenna panel in which a beam is generated, and the corresponding beam transmitting/receiving power information.

FIG. 16 is a diagram illustrating an example of a Tx-Rx beam pair in which SDD is enabled proposed in the present disclosure.

In FIG. 16, Tx beams 1 and 2 and Rx beams 3 and 4 are generated in a UE panel 1, Tx beams 3 and 4 and Rx beams 1 and 2 are generated in a UE panel 2, and because strength of self-interference (SI) received to the Rx beam 1 is small as a specific value or low (or the probability of decreasing is a predetermined value or more) when a signal is transmitted through the Tx beam 1, it is assumed that a (candidate) beam pair in which SDD is enabled is generated.

Similarly, it is assumed that a Tx beam i forms a beam pair relationship in which an Rx beam i (i=2, 3, 4) and an SI value fall below a predetermined value so that simultaneous transmission/reception is possible, i.e., SDD is enabled.

When such combination information is used, the UE may transmit the UL beam and simultaneously receive a DL signal using a specific reception beam. That is, when the UE transmits a UL signal with a specific Tx beam based on the beam pair information, simultaneous transmission and reception for DL/UL is possible by enabling to receive a DL signal with a paired Rx beam.

Here, the base station/transmission reception point (TRP) for transmitting the DL signal and the base station/TRP for receiving the UL signal may be the same, but may be different.

(Method 1)

The UE reports combination information of a Tx beam (or antenna panel or antenna (port)) and an Rx beam (or antenna panel or antenna (port)) in which SDD is enabled (i.e., simultaneous transmission and reception is enabled) or in which a probability of SDD is a predetermined value or more and/or combination information of a Tx beam (or antenna panel or antenna) and an Rx beam (or antenna panel or antenna) in which SDD is disabled (i.e., simultaneous transmission/reception is disabled) or in which a probability of SDD is a predetermined value or less to the base station.

In the combination information of the method 1, Tx beam information may be an explicit Tx beam ID or may be replaced with an RS resource ID or an RS antenna port (group) ID transmitted by the corresponding UE.

The 'RS transmitted by the UE' may be a UL RS or a sidelink RS transmitted by the UE.

In the proposed combination information, when Rx beam information is an explicit Rx beam ID, or when explicit Rx beam ID information is not reported to the base station, the Rx beam information transmission may be replaced with a transmission RS resource ID or an RS antenna port (group) ID of other UE or the base station preferred to receive with the corresponding Rx beam.

When the transmission target is a base station, the 'transmission RS' means a DL RS, and when the transmission target is another UE, the 'transmission RS' means a sidelink RS (or UL RS) received by the corresponding UE.

The combination information may be a one-to-one relationship, but may be also a one-to-many or many-to-one relationship.

That is, there may be a plurality of Rx beams capable of simultaneous reception for one Tx beam, and similarly, there may be a plurality of Tx beams capable of simultaneous transmission for one Rx beam.

Further, there may be Tx beam(s) and/or Rx beam(s) in which SDD is disabled (i.e., unpaired Tx/Rx beam(s)).

For example, a specific beam may be transmitted/received as an omni-directional beam and thus SDD may be disabled.

Whether the SDD is enabled or disabled may be determined according to whether an SI value is below/above a specific threshold (in a specific wireless environment), or whether a probability in which an SI value falls below a threshold is above/below a predetermined value.

In this case, the threshold value may be a value set by the UE itself or may be prescribed to use a specific threshold value.

Alternatively, the network may set a threshold value through system information or an RRC message transmitted for each UE.

Because whether an SI value is below/above the threshold may vary according to the wireless channel environment, a simulation or test environment for the determination may be predefined.

Alternatively, whether SDD is enabled/disabled may be determined only by the shielding effect by the beam pattern and the UE structure, excluding the influence of the radio channel.

The proposed information may be information that changes instantaneously (according to a simulation/test method for SDD enabling/disabling or according to a measurement and reporting method), but may also be an attribute of an implementation characteristic of the UE, i.e., UE capability information.

In the latter case (in the case of UE capability information), it is defined as information irrelevant to a wireless channel environment that changes in real time, and may be information reported only once when accessing a network/system/cell.

When the proposed information is reported as UE capability or long-term information, the DL-UL beam pairs reported as the proposed information are only candidate beam pairs according to UE implementation characteristics or long-term channel attribute, and when transmission/reception is actually performed simultaneously by using corresponding beam pairs, whether the SI value falls below the threshold may vary according to the actual wireless channel environment.

Therefore, an additional process of finding and reporting which beam pair will be SDD enabled/disabled in the radio channel environment of the corresponding UE among the candidate beam pairs reported with the proposed information, or what is the optimal beam pair (having the lowest SI value) among possible several beam pairs may be necessary.

For this operation, the UE may transmit a transmission signal (e.g., SRS) to one or each of a plurality of Tx beams paired with a specific Rx beam reported as the UE capability or long-term information, compare SI levels (and reception quality of (DL signal), etc.), updates a SDD enabling beam pair(s) in consideration of the real-time channel, report the updated SDD enabling beam pair(s) to the base station, or report the optimal Tx beam(s) (or preferred by the UE) for the corresponding Rx beam in the corresponding radio channel.

The information may be reported for all Rx beams, the number specified by the base station or only for the specified UE Rx beam(s), or for the specific number of Rx beams selected by the UE (in consideration of DL reception quality, etc.).

The SDD enabling Tx beam(s) information or preferred Tx beam(s) information about the reported Rx beam(s) may include a case in which SDD is enabled for the corresponding Rx beam or in which no preferred Tx beam is present.

Alternatively, the information may be reported in the form of ON/OFF information about a Tx-Rx beam pair previously configured (or indicated) by the network or reported by the UE.

Here, OFF may mean that an SI level of the corresponding beam pair is a threshold or more or that SDD is disabled (when reporting for each beam pair), that there is no Tx beam in which SDD is enabled for the corresponding Rx beam (when reporting for each Rx beam), that there is no Rx beam in which SDD is enabled for the corresponding Tx beam (when reporting for each Tx beam), that use of the corresponding beam pair is not preferred to the UE (when reporting for each beam pair), or that use of the corresponding Rx beam is not preferred (when reporting for each Rx beam), or that use of the corresponding Tx beam is not preferred (when reporting for each Tx beam).

When the Tx-Rx beam pair information is measured (and reported) in consideration of a (long-term or short-term) radio channel environment, the UL Tx beam ID information may be SRS resource ID (SRI) information.

The DL Rx beam ID information is not explicitly signaled to the current NR standard, and only the DL Tx beam ID information is used for beam indication of the base station and preferred beam report information of the UE.

In this case, the DL Tx beam ID is expressed as a CSI-RS resource ID (CRI) or an SS block ID.

However, when the UE reports the preferred DL Tx beam ID to the base station, it is assumed that the UE (embodiedly) selects and reports the optimal DL Rx beam for the corresponding DL Tx beam.

Therefore, the above-described DL Rx beam ID information may be replaced with preferred DL Tx beam ID information (e.g., CRI, SS block ID) from the viewpoint of a DL transmission/reception beam pair.

As a result, the UE may measure and report the M number of CRI or SSB IDs preferred (or SDD is enabled) for each of the N number of SRS resources.

As described above, the N value may be determined by the total number of Rx beams of the UE, follow a value designated by the base station, or may be a value selected by the UE (in consideration of SI value and DL reception quality, etc.).

Alternatively, it is also possible for the base station to directly designate the N number of SRI(s) to be reported by the UE.

When there is no transmission beam in which SDD may be enabled, the UE may report N=0.

The M value may be designated by the base station or may be determined by the UE based on a specific criterion.

Examples of the specific criterion may include whether an SI level measured from a UL signal exceeds a threshold, whether a reception quality for a DL signal exceeds a threshold, or a combination of the two criterions.

In the latter case, when there is no pairable (or preferred) CSI-RS/SSB Tx beam for the corresponding SRS Tx beam, a specific value (e.g., using a specific field of CQI) promised to report in M=0, a null value, or this case may be reported.

While the base station, having received the report information receives the corresponding DL Tx signal for the UE receiving the DL Tx signal (e.g., CSI-RS, PDSCH, PDCCH, etc.) designated and transmitted with the corresponding DL Tx beam, the base station may set (or designate or trigger) to simultaneously transmit a UL Tx signal (e.g., SRS, PUSCH, PUCCH, etc.) using a paired UL Tx beam (i.e., using the same OFDM symbol).

(Method 1-1)

The UE reports the preferred (or SDD enabling) M number of DL Tx beam IDs (e.g., CRI, SSB ID) for one or a plurality of UL Tx beam IDs (e.g., SRI) (M may include 0, and M may vary for each SRI).

The above-described DL/UL beam management process cannot be performed simultaneously for a UE (half duplex UE) in which transmission and reception cannot be simultaneously performed.

Therefore, when the base station (or transmission and reception point (TRP)) is configured with the Nt number of DL Tx beams and the Mr number of UL Tx beams, and when the UE is configured with the Mt number of Tx beams and the Nr number of DL Rx beams, in order to match a DL beam pair, the total Nt×Nr number of DL RS sub-symbols are required, and in order to match a UL beam pair, the total Mt×Mr number of UL RS sub-symbols are required.

While the base station, having received report information of Method 1 and/or Method 2 to be described later transmits an UL RS (e.g., SRS) to a specific UL Tx beam based on the UE beam pair information, the base station may indicate (or configure) to receive the DL RS with the corresponding UL Tx beam and a paired DL Rx beam (e.g., CSI-RS, SSB) in the same symbol.

Corresponding signals may be mapped (FDM) to different RE(s) in the frequency domain or to the same RE(s). That is, the following operation may be indicated.

(Method 2)

For the UE in which SDD is enabled, the base station configures (or indicates) a transmitting RS (e.g., SRS, sidelink Tx RS) or a transmitting physical channel (e.g., PRACH, PUCCH, PUSCH) and a receiving RS (e.g., CSI-RS, SSB, sidelink Rx RS) or a receiving physical channel (e.g., PDSCH, PDCCH) to a frequency division multiplexed (FDMed) RE(s) and/or an overlapped RE(s) with the same symbol (set).

The FDMed REs may be mapped to different RB sets in the same component carrier (or bandwidth part), and/or may be mapped to have different subcarrier index(es) within the same RB(s).

As an embodiment of the method 2, in indicating/configuring a DL beam management process using the DL RS symbol(s) and a UL beam management process using the UL RS symbol(s), some (or all) DL RS symbols (resources) and UL RS symbols (resources) may be allowed to overlap. That is, it is possible to perform DL-UL joint beam management. In this case, the overlapping DL RS resource(s) and UL RS resource(s) may have a characteristic to be limited to the case belonging to the SDD beam pair reported by the UE in proposal 1.

(Method 2-1)

In the same sub-symbol set, the UE that has received an indication (or configuration) for simultaneous transmission and reception of the transmission RS/channel and the reception RS/channel performs simultaneous transmission and reception using the SDD enabling beam pair previously reported or configured (or indicated) from the base station.

For example, it is assumed that three 1 symbol SRS resources have been each set to symbols #{1, 4, 5} and that four 1 symbol CSI-RS resources have been each set to symbols #{2, 3, 4, 5}.

Because simultaneous transmission/reception was set in symbols #{4, 5}, a UL Tx beam using when transmitting an SRS resource #2 sets each beam by selection from the UE or by an indication of the base station among beams belonging to the SDD beam pair relationship with the DL Rx beam receiving CRI #3.

Similarly, it may be assumed (or indicated) that the UE operation is also performed for SRI #3 and CRI #4.

That is, the base station that has indicated this configuration may assume that the UE transmission beam for SRI #2/#3 and the UE reception beam for CRI #3/#4 have been each made through a transmission/reception beam pair (pre-reported from the UE or pre-indicated from the base station).

Therefore, when the base station indicates to use a specific Tx beam for SRI #2 or SRI #3, the base station may assume that the paired Rx beam has been used for the CSI-RS configured for simultaneous reception with the corresponding SRS resource.

When SRS beam sweeping has been previously performed for Tx beam indication for the SRS resource, the Tx beam may be indicated by SRI.

When beam/channel reciprocity of the UE is established, the CRI or SSB ID may be indicated to use the UL transmission beam corresponding to the beam used for the DL reception beam.

Conversely, when it is indicated that the base station has used a specific DL Tx beam for CRI #3 or CRI #4 (indicated by a QCL relationship for a spatial parameter with another CSI-RS resource or SSB), the UE may apply the UL Tx beam in a paired relationship with the optimal DL Rx beam for the corresponding DL Tx beam to SRI #2 or SRS #3 transmission.

When SDD enabling Tx-Rx beam pair is in a one-to-one relationship, even if there is no separate indication (or configuration), the other side beam (e.g., Rx beam) may be implicitly indicated only with the indication of one beam (e.g., Tx beam) by the previously reported or preconfigured Tx-Rx beam pair relationship.

In other words, the UE does not expect to receive indication/configuration of simultaneous transmission and reception in the same symbol (set) for DL RS resource(s) and UL RS resource(s) reported with an unpaired relationship (or not reported with a paired relationship).

Further, in the present disclosure, descriptions on UL signal transmission (beam) characteristics and DL signal reception (beam) characteristics of the UE may be extended and applied to communication between UEs.

In this case, the UL transmission beam may be changed and applied to a side-link transmission beam, and the DL reception beam may be changed and applied to a side-link reception beam, and a subject receiving a transmission signal from the corresponding UE (or device) and a subject transmitting a signal to the corresponding UE may be the same or different.

The above-described method proposed in the present disclosure may be also be extended and applied to a case of receiving a signal with a specific reception beam (with SDD enabled characteristics) for another carrier or BWP at a corresponding transmission symbol position while transmitting a signal with a specific transmission beam for a specific carrier or BWP.

In this case, the plurality of carriers/BWPs may be limited to (adjacent) carriers/BWPs that commonly apply the same beam.

Whether the common beam may be applied is explicitly indicated (or configured), or in the case of DL, it may be implicitly indicated (or grasped) according to whether there is spatial QCL between DL RSs set to different carriers/BWPs, and in the case of UL, it may be implicitly indicated (or grasped) according to whether there is spatial relation between UL RSs set to different carriers/BWPs.

The above various methods and/or embodiments may be implemented separately, but one or more methods or embodiments may be combined and implemented.

Hereinafter, a method of operating a UE and a base station for implementing the method proposed in the present disclosure will be described based on the above contents.

FIG. 17 is a flowchart illustrating an example of an operation method of a UE for implementing a method proposed in the present disclosure.

That is, FIG. 17 shows an operation of a UE for a method for simultaneously transmitting and receiving an uplink signal and a downlink signal in a wireless communication system for supporting spatial division duplexing (SDD).

First, the UE performs beam measurement through at least one radio unit including a plurality of antennas based on resources related to beam management (S1710).

Next, the UE reports a result of the beam measurement to the base station (S1720).

Here, the result of the beam measurement may include at least one of first beam pair information about a combination of a transmission beam and a reception beam in which the SDD is enabled or second beam pair information about a combination of a transmission beam and a reception beam in which the SDD is disabled.

The transmission beam may be a transmission reference signal (RS) resource ID (identifier), and the reception beam may be a reception RS resource ID.

Next, when the UE receives a configuration for simultaneous transmission and reception of the uplink signal and the downlink signal on the same symbol from the base station, the UE simultaneously transmits and receives the uplink signal and the downlink signal to and from the base station based on the first beam pair information (S1730).

The uplink signal and the downlink signal are frequency division multiplexed (FDM) on the same symbol.

The uplink signal and the downlink signal may be mapped to different resource block (RB) sets in a bandwidth part (BWP) or to different subcarrier indexes in the same RB set.

Additionally, the UE receives information indicating a specific beam pair among the first beam pair information from the base station.

In this case, the UE may simultaneously transmit and receive the uplink signal and the downlink signal to and from the base station based on the specific beam pair.

Here, the step of performing beam measurement may include searching for a beam pair in which SDD is enabled so as to simultaneously transmit and receive the uplink signal and the downlink signal.

Further, the combination of the transmission beam and the reception beam may have a one-to-one mapping or many-to-one mapping relationship.

Further, whether the SDD is enabled or disabled may be determined by comparing a value of self-interference (SI) and a specific threshold.

FIG. 18 is a flowchart illustrating an example of an operation method of a base station for implementing a method proposed in the present disclosure.

That is, FIG. 18 shows an operation of a base station for a method for simultaneously transmitting and receiving an uplink signal and a downlink signal in a wireless communication system for supporting spatial division duplexing (SDD).

First, the base station transmits information related to beam measurement of the UE to the UE (S1810).

Next, the base station receives a result of beam measurement of the UE from the UE (S1820).

Here, the result of the beam measurement may include at least one of first beam pair information about a combination of a transmission beam and a reception beam in which the SDD is enabled or second beam pair information about a combination of a transmission beam and a reception beam in which the SDD is disabled.

The transmission beam may be a transmission reference signal (RS) resource identifier (ID), and the reception beam may be a reception RS resource ID.

Next, the base station sets simultaneous transmission and reception of the uplink signal and the downlink signal on the same symbol (S1830).

Next, the base station simultaneously transmits and receives the uplink signal and the downlink signal to and from the UE based on the first beam pair information (S1840).

The uplink signal and the downlink signal are frequency division multiplexed (FDM) on the same symbol.

The uplink signal and the downlink signal may be mapped to different resource block (RB) sets in a bandwidth part (BWP) or to different subcarrier indexes in the same RB set.

Additionally, the base station transmits information indicating a specific beam pair among the first beam pair information to the UE.

In this case, the base station may simultaneously transmit and receive the uplink signal and the downlink signal to and from the UE based on the specific beam pair.

Further, the combination of the transmission beam and the reception beam may have a one-to-one mapping or many-to-one mapping relationship.

Further, whether the SDD is enabled or disabled may be determined by comparing a value of self-interference (SI) and a specific threshold.

The above-described methods of FIGS. 17 and 18 may be specifically implemented through a device to be described later or a component in each device.

General Device to which the Present Disclosure May be Applied

FIG. 19 illustrates a block diagram of a wireless communication device to which methods proposed in the present disclosure may be applied.

Referring to FIG. 19, a wireless communication system includes a base station 1910 and a plurality of UEs 1920 located within a base station area.

Each of the base station and the UE may be represented with a wireless device.

The base station includes a processor 1911, a memory 1912, and a radio frequency module (RF module) 1913. The processor 1911 implements the functions, processes, and/or methods proposed in FIGS. 1 to 18. Layers of a wireless interface protocol may be implemented by the processor. The memory is connected to the processor to store various pieces of information for driving the processor. The RF module is connected to the processor to transmit and/or receive a radio signal.

The UE includes a processor 1921, a memory 1922, and an RF module 1923.

The processor implements the functions, processes, and/or methods proposed in FIGS. 1 to 18. Layers of the wireless interface protocol may be implemented by the processor. The memory is connected to the processor to store various pieces of information for driving the processor. The RF module is connected to the processor to transmit and/or receive a radio signal.

The memories 1912 and 1922 may be inside or outside the processors 1911 and 1921, and be connected to the processor through various well-known means.

Further, the base station and/or the UE may have a single antenna or multiple antennas.

Antennas 1914 and 1924 function to transmit and receive radio signals.

FIG. 20 is another example of a block diagram of a wireless communication device to which methods proposed in the present disclosure may be applied.

Referring to FIG. 20, a wireless communication system includes a base station 2010 and a plurality of UEs 2020 located within a base station area. The base station may be represented as a transmitting device, and the UE may be represented as a receiving device, and vice versa. The base station and the UE include processors 2011 and 2021, memories 2014 and 2024, one or more Tx/Rx radio frequency modules (RF module) 2015 and 2025, Tx processors 2012 and 2022, Rx processors 2013 and 2023, and antennas 2016 and 2026. The processor implements the above-described functions, processes, and/or methods. More specifically, in DL (communication from the base station to the UE), higher layer packets from the core network are provided to the processor 2011. The processor implements functions of an L2 layer. In DL, the processor provides multiplexing and radio resource allocation between logical channels and transport channels to the UE 2020, and is responsible for signaling to the UE. The transmission (TX) processor 2012 implements various signal processing functions for an L1 layer (i.e., physical layer). The signal processing function facilitates forward error correction (FEC) in the UE, and includes coding and interleaving. The coded and modulated symbols are divided into parallel streams, each stream is mapped to an OFDM subcarrier, multiplexed with a reference signal (RS) in the time and/or frequency domain, and coupled together using Inverse Fast Fourier Transform (IFFT) to generate a physical channel carrying a time domain OFDMA symbol stream. The OFDM stream is spatially precoded so as to generate multiple spatial streams. Each spatial stream may be provided to a different antenna 2016 through a separate Tx/Rx module (or the transceiver 2015). Each Tx/Rx module may modulate an RF carrier with each spatial stream for transmission. In the UE, each Tx/Rx module (or the transceiver 2025) receives a signal through each antenna 2026 of each Tx/Rx module. Each Tx/Rx module restores information modulated by an RF carrier and provides the information to the reception (RX) processor 2023. The RX processor implements various signal processing functions of a layer 1. The RX processor may perform spatial processing on information so as to recover an arbitrary spatial stream directed to the UE. When multiple spatial streams are directed to the UE, they may be coupled to a single OFDMA symbol stream by multiple RX processors. The RX processor transforms the OFDMA symbol stream from a time domain to a frequency domain using Fast Fourier Transform (FFT). The frequency domain signal includes a separate OFDMA symbol stream for each subcarrier of the OFDM signal. The symbols and reference signal on each subcarrier are restored and demodulated by determining the most probable signal disposition points transmitted by the base station. These soft decisions may be based on channel estimation values. The soft decisions are decoded and deinterleaved so as to restore the data and control signal originally transmitted by the base station on the physical channel. Corresponding data and control signals are provided to the processor 2021.

UL (communication from the UE to the base station) is processed in the base station 2010 in a manner similar to that described related to a receiver function in the UE 2020. Each Tx/Rx module 2025 receives a signal through each antenna 2026. Each Tx/Rx module provides an RF carrier and information to the RX processor 2023. The processor 2021 may be related to the memory 2024 that stores program codes and data. The memory may be referred to as a computer-readable medium.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

INDUSTRIAL AVAILABILITY

The method of transmitting/receiving a signal in a wireless communication system of the present disclosure has been described centering on an example applied to a 3 GPP LTE/LTE-A system and a 5G system (New RAT system), but it may be applied to various wireless communication systems.

The invention claimed is:

1. A method for simultaneously transmitting and receiving an uplink signal and a downlink signal in a wireless communication system for supporting spatial division duplexing (SDD), the method performed by a terminal comprising:
 performing beam measurement based on at least one radio unit comprising a plurality of antennas and a resource related to beam management;
 reporting a result of the beam measurement to a base station,
 wherein the result of the beam measurement comprises at least one of first beam pair information about a combination of a transmission beam and a reception beam in which the SDD is enabled or second beam pair information about a combination of a transmission beam and a reception beam in which the SDD is disabled;
 receiving, from the base station, downlink-uplink (DL-UL) joint beam management configuration for simultaneous transmission and reception of the uplink signal and the downlink signal through at least one overlapped resource among channel state information reference signal (CSI-RS) resources and sounding reference signal (SRS) resources; and
 simultaneously transmitting and receiving the uplink signal and the downlink signal to and from the base station through the at least one overlapped resource based on the first beam pair information.

2. The method of claim 1, wherein the transmission beam is a transmission reference signal (RS) resource identifier (ID), and the reception beam is a reception RS resource ID.

3. The method of claim 1, further comprising receiving information indicating a specific beam pair among the first beam pair information from the base station,
wherein the uplink signal and the downlink signal are simultaneously transmitted and received to and from the base station based on the specific beam pair.

4. The method of claim 1, wherein the performing of beam measurement comprises searching for a beam pair in which SDD is enabled so as to simultaneously transmit and receive the uplink signal and the downlink signal.

5. The method of claim 1, wherein the combination of the transmission beam and the reception beam has a one-to-one mapping or many-to-one mapping relationship.

6. The method of claim 1, wherein whether the SDD is enabled or disabled is determined through comparison of a value of self-interference (SI) and a specific threshold.

7. A terminal for simultaneously transmitting and receiving an uplink signal and a downlink signal in a wireless communication system for supporting spatial division duplexing (SDD), the terminal comprising:
a transmitter for transmitting a radio signal;
a receiver for receiving the radio signal; and
a processor functionally connected to the transmitter and the receiver, wherein the processor is configured to:
perform beam measurement based on at least one radio unit comprising a plurality of antennas and a resource related to beam management;
report a result of the beam measurement to the base station,
wherein the result of the beam measurement comprises at least one of first beam pair information about a combination of a transmission beam and a reception beam in which the SDD is enabled or second beam pair information about a combination of a transmission beam and a reception beam in which the SDD is disabled;
receive, from the base station, downlink-uplink (DL-UL) joint beam management configuration for simultaneous transmission and reception of the uplink signal and the downlink signal through at least one overlapped resource among channel state information reference signal (CSI-RS) resources and sounding reference signal reference signal (SRS) resources; and
control the transmitter and the receiver to simultaneously transmit and receive the uplink signal and the downlink signal to and from the base station through the at least one overlapped resource based on the first beam pair information.

8. The terminal of claim 7, wherein the transmission beam is a transmission reference signal (RS) resource identifier (ID), and the reception beam is a reception RS resource ID.

9. The terminal of claim 7, wherein the processor controls the receiver to receive information indicating a specific beam pair among the first beam pair information from the base station and controls the transmitter and the receiver to simultaneously transmit and receive the uplink signal and the downlink signal to and from the base station based on the specific beam pair.

10. The terminal of claim 7, wherein the processor controls to perform the beam measurement by searching for a beam pair in which SDD is enabled so as to simultaneously transmit and receive the uplink signal and the downlink signal.

11. The terminal of claim 7, wherein the combination of the transmission beam and the reception beam has a one-to-one mapping or many-to-one mapping relationship.

* * * * *